(12) United States Patent
Uchiyama

(10) Patent No.: US 10,831,288 B2
(45) Date of Patent: Nov. 10, 2020

(54) PROJECTOR, PROJECTION SYSTEM, AND DETECTION LIGHT RADIATOR

(71) Applicant: SEIKO EPSON CORPORATION, Tokyo (JP)

(72) Inventor: Shoichi Uchiyama, Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 11 days.

(21) Appl. No.: 15/785,060

(22) Filed: Oct. 16, 2017

(65) Prior Publication Data

US 2018/0120960 A1    May 3, 2018

(30) Foreign Application Priority Data

Oct. 27, 2016   (JP) .................................. 2016-210306

(51) Int. Cl.
| | |
|---|---|
| *G06F 3/0354* | (2013.01) |
| *G06F 3/042* | (2006.01) |
| *H04N 9/31* | (2006.01) |
| *G06F 3/038* | (2013.01) |
| *G03B 17/54* | (2006.01) |

(Continued)

(52) U.S. Cl.
CPC ......... *G06F 3/03542* (2013.01); *G03B 17/54* (2013.01); *G06F 3/0383* (2013.01); *G06F 3/0386* (2013.01); *G06F 3/0416* (2013.01); *G06F 3/0425* (2013.01); *H04N 9/3164* (2013.01); *H04N 9/3179* (2013.01); *H04N 9/3194* (2013.01); *G03B 21/145* (2013.01)

(58) Field of Classification Search
CPC combination set(s) only.
See application file for complete search history.

(56) References Cited

U.S. PATENT DOCUMENTS 7,626,578 B2    12/2009   Wilson et al.
9,159,255 B2 *  10/2015   Watanabe .............. G09G 3/004
(Continued)

FOREIGN PATENT DOCUMENTS

| JP | 2004-326188 A | 11/2004 |
|---|---|---|
| JP | 2006-71918 A  | 3/2006  |

(Continued)

*Primary Examiner* — Temesghen Ghebretinsae
*Assistant Examiner* — Sosina Abebe
(74) *Attorney, Agent, or Firm* — Oliff PLC

(57) ABSTRACT

A projector including an exterior enclosure, a light source apparatus, a light modulator, a projection optical apparatus, a plurality of detection light radiators that radiate detection light used to detect a pointing element onto a projection area, an imager that receives light that belongs to a wavelength region including the wavelength of the detection light to capture an image of the projection area, and a position detector that detects the position of the pointing element in the projection area based on the image captured by the imager, wherein the plurality of detection light radiators are arranged in different positions on the exterior enclosure, the plurality of detection light radiators include a first detection light radiator, and the first detection light radiator is so configured that a distance therefrom to another detection light radiator out of the plurality of detection light radiators is changeable.

11 Claims, 13 Drawing Sheets

(51) Int. Cl.
*G06F 3/041* (2006.01)
*G03B 21/14* (2006.01)

(56) References Cited

U.S. PATENT DOCUMENTS

| | | | | |
|---|---|---|---|---|
| 2004/0248022 | A1* | 12/2004 | Yoshida | H04N 9/315 430/32 |
| 2006/0083005 | A1* | 4/2006 | Sokolov | G02B 5/12 362/341 |
| 2006/0170874 | A1* | 8/2006 | Yumiki | G03B 21/14 353/42 |
| 2008/0244468 | A1* | 10/2008 | Nishihara | G06F 3/017 715/863 |
| 2009/0002344 | A1 | 1/2009 | Wilson et al. | |
| 2010/0296285 | A1* | 11/2010 | Chemel | F21V 21/00 362/235 |
| 2011/0007283 | A1* | 1/2011 | Tanaka | H04N 9/3185 353/70 |
| 2012/0256825 | A1* | 10/2012 | Nakanishi | G09G 5/00 345/156 |
| 2013/0038524 | A1* | 2/2013 | Otsuki | G09G 5/00 345/156 |
| 2013/0314380 | A1* | 11/2013 | Kuribayashi | G06F 3/0325 345/175 |
| 2014/0268358 | A1* | 9/2014 | Kusaka | G02B 27/01 359/631 |
| 2016/0259402 | A1* | 9/2016 | Masuda | H04N 9/3194 |
| 2016/0282968 | A1 | 9/2016 | Henninen et al. | |

FOREIGN PATENT DOCUMENTS

| | | |
|---|---|---|
| JP | 2006-92516 A | 4/2006 |
| JP | 2012-150636 A | 8/2012 |
| JP | 2016-186674 A | 10/2016 |

* cited by examiner

PROJECTOR, PROJECTION SYSTEM, AND DETECTION LIGHT RADIATOR

BACKGROUND

1. Technical Field

The present invention relates to a projector, a projection system, and a detection light radiator.

2. Related Art

There is a known projector of related art including a light source apparatus, a light modulator that modulates light outputted from the light source apparatus, and a projection optical apparatus that projects the light modulated by the light modulator.

As a projector of this type, there is a known projector that projects a projection image in a projection area, such as a screen, captures an image containing a target object, such as a finger, with a camera, and uses the captured image to detect the position of the target object (see JP-A-2012-150636, for example).

The projector described in JP-A-2012-150636 recognizes that a predetermined instruction is inputted to the projection area when the target object, such as a finger, is used as a pointing element that points a projection image portion and the front end of the target object is in contact with the screen. A user can thus input a variety of instructions by using the projection area as a user interface.

For example, a projection image containing a line or any other object according to the instruction can be displayed. A projector of this type that allows a projection image portion of the screen to be used as an inputtable user interface is called an interactive projector.

In the interactive projector described above, to detect the position of the pointing element, the pointing element is irradiated with detection light, such as infrared light, and the detection light reflected off the pointing element is captured with a camera. To detect the position of the pointing element on the basis of a captured image as described above, the difference in contrast between the pointing element and the projection area is used to determine the position of the pointing element in the image. An image captured with the camera is therefore desired to provide a sufficiently high contrast between the pointing element and the projection area.

To increase the contrast to a sufficiently large value, it is conceivable to provide a plurality of detection light radiators that each output detection light.

However, since the distance between the projection area and each of the detection light radiators varies in accordance with a portion of the projection area, it is undesirably difficult to appropriately radiate the detection light from each of the detection light radiators in such a way that the pointing element can be detected.

SUMMARY

An advantage of some aspects of the invention is to provide a projector, a projection system, and a detection light radiator that can appropriately radiate detection light for detecting a pointing element onto a projection area.

A projector according to a first aspect of the invention includes an exterior enclosure that forms an exterior of the projector, a light source apparatus, a light modulator that modulates light outputted from the light source apparatus to form a projection image, a projection optical apparatus that projects the projection image formed by the light modulator, a plurality of detection light radiators that radiate detection light used to detect a pointing element onto a projection area where the projection optical apparatus projects the projection image, an imager that receives light that belongs to a wavelength region including a wavelength of the detection light to capture an image of the projection area, and a position detector that detects a position of the pointing element in the projection area based on the image captured by the imager. The plurality of detection light radiators are arranged in different positions on the exterior enclosure. The plurality of detection light radiators include a first detection light radiator. The first detection light radiator is so configured that a distance therefrom to another detection light radiator out of the plurality of detection light radiators is changeable.

In a case where a detection light radiator is disposed in a single position, when the projection area is irradiated with the detection light, an area where the contrast between the projection area where a projection image is projected and the pointing element is relatively low (hereinafter referred to as low contrast area in some cases) is present. In the low contrast area, even when it is irradiated with the detection light, it is difficult for the imager to capture an image of the pointing element.

On the other hand, in the case where a plurality of detection light radiators are disposed in different positions on the exterior enclosure, and even a case where the distance between the screen or any other surface and the projector and the positions thereof vary in accordance with the size of the projection area which is part of the screen or any other surface and where a projection image is projected, and the low contrast areas created by the plurality of detection light radiators do not overlap with each other when the projector is located in a position corresponding to a certain size of the projection area, changing the size of the projection area may cause the low contrast areas created by the plurality of detection light radiators to overlap with each other. In this case, when the plurality of detection light radiators each radiate the detection light onto the projection area, it is possible that the pointing element cannot be detected in some cases.

In contrast, according to the first aspect described above, since the at least one first detection light radiator is so configured that the distance therefrom to another detection light radiator is changeable, the distance from each of the detection light radiators to the projection area can be changed, and the detection light radiators can each radiate the detection light in such a way that the low contrast areas are complementary to each other. Therefore, since the projection area can be appropriately irradiated with the detection light for detecting the pointing element, the imager can capture an image that allows detection of the position of the pointing element, and the position of the pointing element can be appropriately detected.

Out of the plurality of detection light radiators, the angle of incidence of the detection light outputted from a detection light radiator having a relatively short value of the distance described above to the projection area where a projection image is displayed and incident on the projection area is greater than the angle of incidence of the detection light radiated from a detection light radiator having a relatively long distance to the projection area and incident on the projection area. Therefore, depending on the size of the projection area, it is difficult to appropriately radiate the detection light radiated from the detection light radiator having a relatively short value of the distance described above to the projection area onto the projection area.

In contrast, according to the configuration described above, in a case where the detection light radiator having a relatively short value of the distance to the projection area is configured to be movable in the direction along a normal to the projection area, even when the projection area has any size, the detection light radiator can be moved to a position where the detection light radiator can appropriately radiate the detection light, that is, a position where the low contrast area based on the first detection light radiator in the projection area and the low contrast area based on another detection light radiator in the projection area do not overlap with each other.

In the first aspect described above, it is preferable that the first detection light radiator has a shortest distance to the projection area in a direction of a normal to the projection area.

Since the distance from the first detection light radiator, which has the shortest distance to the projection area, to the projection area can be shortened to increase the luminance of the detection light incident on the projection area, the contrast between the projection area and the pointing element can be increased. Therefore, since the imager can reliably capture an image of the pointing element irradiated with the detection light, the position of the pointing element can be more reliably detected. The reliability of the projector can therefore be improved by a greater amount.

In the first aspect described above, it is preferable that the plurality of detection light radiators each include a light source that emits the detection light toward a side opposite the projection area and a reflection mirror that reflects the detection light emitted from the light source toward the projection area, and that the reflection mirror has a concave surface that is concave in a direction along a direction in which the light is incident.

The concave surface can, for example, be a free-form surface having a light orientation characteristic that decreases the light flux density of the detection light to he incident on the detection light radiator side in the projection area, when viewed from a position facing the projection area, out of the detection light incident on the concave surface but increases the light flux density of the detection light to be incident on the side opposite the detection light radiator in the projection area out of the detection light incident on the concave surface.

According to the configuration described above, since the free-from surface of the reflection mirror can control the light flux density according to the radiation angular range and the radiation angle of the detection light emitted from the light source of the detection light radiator, the detection light can be readily controlled.

In a case where the reflection mirror does not have the concave surface described above, the light flux density of the detection light reflected off the reflection mirror and radiated onto the projection area is large on the side closer to the detection light radiator in the projection area but small on the side far away from the detection light radiator in the projection area. The light flux density in the projection area cannot therefore be homogenized.

In contrast, according to the configuration described above, since the reflection mirror has the concave mirror described above, the light flux density of the detection light outputted from each of the detection light radiators can be homogenized in the projection area, whereby the illuminance in the projection area irradiated with the detection light is likely to be homogenized. As a result, a captured image of the pointing element in any position in the projection area has uniform brightness, whereby a situation in which the pointing element is unlikely to be detected can be avoided even when the pointing element is located in any position in the projection area.

In the first aspect described above, it is preferable that the light source provided in at least one of the plurality of detection light radiators emits the detection light in a direction along a normal to the projection area.

According to the configuration described above, since the clearance between the light flux reflected off the reflection mirror and the light source can be ensured, the distance between the mirror and the light source can be reduced, and increase in the size of the reflection mirror can be avoided, whereby a compact detection light radiator can be achieved.

In the first aspect described above, it is preferable that the light source of the first detection light radiator emits the detection light in a direction that inclines with respect to a normal to the projection area.

For example, in a case where the light source emits the detection light in a direction that inclines downward (side toward which projection image (image light) projected from the projection optical apparatus travels) with respect to a normal to the projection area, the light source is disposed above the position from which the light source can emit the detection light in the direction along the normal to the projection area (side opposite the side toward which the image light projected from the optical projection apparatus travels). Therefore, as compared with a case where the light source emits the detection light in the direction along the normal described above and in a direction that inclines upward, the light flux density of the detection light in the projection area can be more uniform, although the size of the mirror increases, whereby the pointing element can be more readily detected. Further, since the light flux density of the detection light can be readily homogenized by the arrangement of the light source, the mirror is readily designed and manufactured.

A projection system according to a second aspect includes the projector described above and a fixture that fixes the projector in a predetermined position, and the fixture includes a support that supports at least one of the plurality of detection light radiators.

The predetermined position described above can, for example, be a wall by way of example.

According to the second aspect described above, the same advantageous effects as those provided by the projector according to the first aspect described above can be provided. Further, since the support of the fixture, which fixes the projector, can support at least one of the detection light radiators, the distance described above from the first deflection light radiator to another detection light radiator can be further increased.

A detection light radiator according to a third aspect of the invention includes a light source that emits detection light for detecting a pointing element and a reflection mirror that reflects the detection light emitted from the light source, and the reflection mirror has a concave surface that is concave in a direction along a direction in which the light is incident.

The concave surface can, for example, be a free-form surface having a light orientation characteristic that decreases the light flux density of the detection light to be incident on the detection light radiator side in the projection area out of the detection light incident on the concave surface but increases the light flux density of the detection light to be incident on the side opposite the detection light radiator in the projection area out of the detection light incident on the concave surface.

According to the configuration described above, since the free-from surface of the reflection mirror can control the light flux density according to the radiation angular range and the radiation angle of the detection light emitted from the light source of the detection light radiator, the detection light can be readily controlled.

In a case where the reflection mirror does not have the concave surface described above, the light flux density of the detection light reflected off the reflection mirror and radiated onto the projection area is large on the side closer to the detection light radiator in the projection area but small on the side far away from the detection light radiator in the projection area. The light flux density in the projection area cannot therefore be homogenized.

In contrast, according to the configuration described above, since the reflection mirror has the concave mirror described above, the light flux density of the detection light outputted from each of the detection light radiators can be homogenized in the projection area, whereby the illuminance in the projection area irradiated with the detection light is likely to be homogenized. As a result, a captured image of the pointing element in any position in the projection area has uniform brightness, whereby a situation in which the pointing element is unlikely to be detected can be avoided even when the pointing element is located in any position in the project ion area.

In the third aspect described above, it is preferable that the light source emits the detection light in a direction along a normal to a projection area irradiated with the detection light.

According to the configuration described above, since the clearance between the light flux reflected off the reflection mirror and the light source can be ensured, the distance between the mirror and the light source can be reduced, and increase in the size of the reflection mirror can be avoided, whereby a compact detection light radiator can be achieved.

In the third aspect described above, it is preferable that the light source emits the detection light in a direction that inclines with respect to a normal to a projection area irradiated with the detection light.

For example, in a case where the light source emits the detection light in a direction that inclines downward (side toward which projection image (image light) projected from the projection optical apparatus travels) with respect to a normal to the projection area, the light source is disposed above the position from which the light source can emit the detection light in the direction along the normal to the projection area (side opposite the side toward which the projection image (image light) projected from the optical projection apparatus travels). Therefore, as compared with a case where the light source emits the detection light in the direction along the normal described above and in a direction that inclines upward, the light flux density of the detection light in the projection area can be more uniform, although the size of the mirror increases, whereby the pointing element can be more readily detected. Further, since the light flux density of the detection light can be readily homogenized by the arrangement of the light source, the mirror is readily designed and manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projection system according to a first embodiment of the invention will be described below with reference to the drawings.

Overview of Projection System

Figure 1:
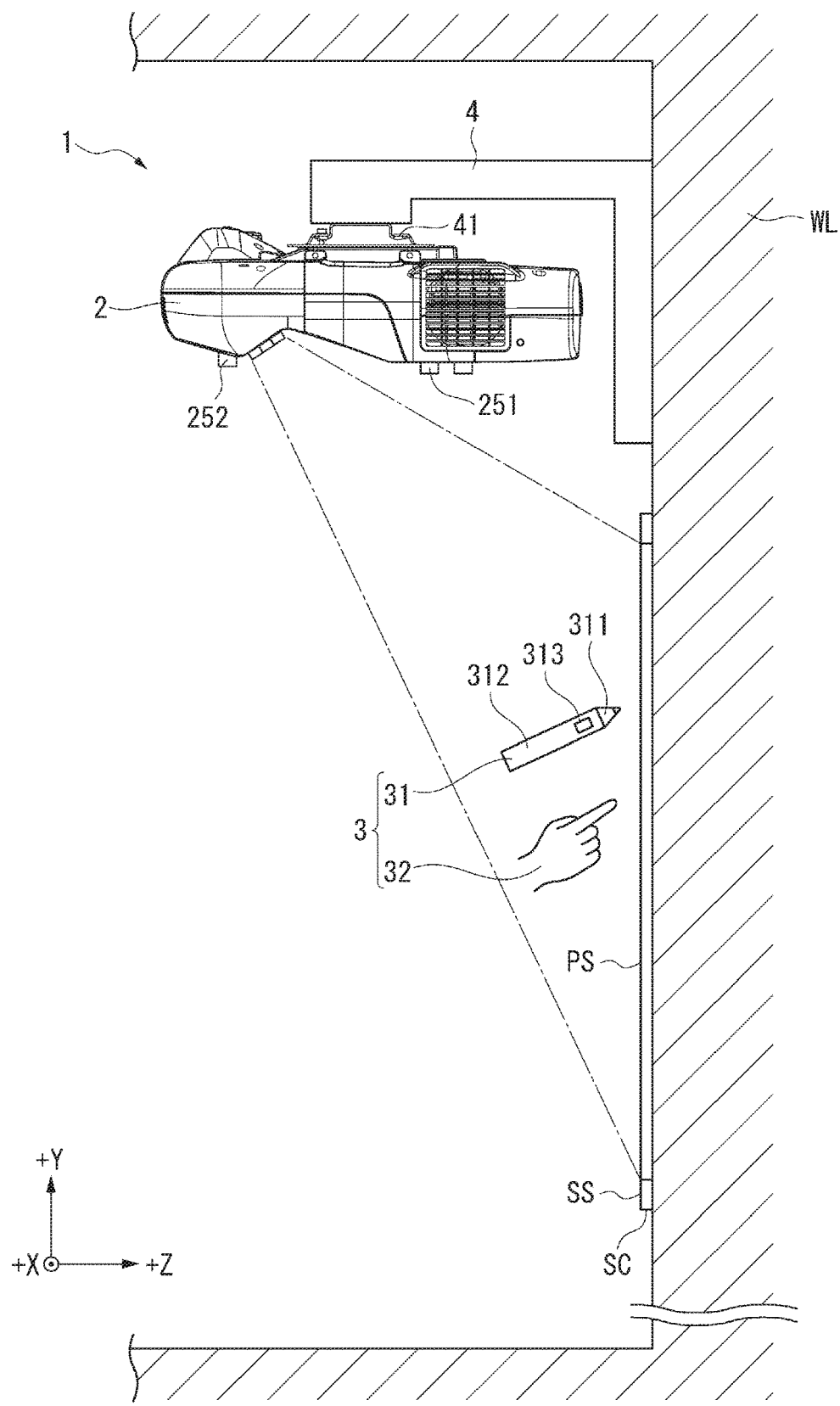
FIG. 1 is a schematic view showing a projection system according to a first embodiment of the invention.

FIG. 1 is a schematic view showing a projection system 1 according to the present embodiment.

The projection system (hereinafter simply referred to as "system" in some cases) 1 is an interactive projection system that recognizes a predetermined instruction performed on an area where a projection image is projected and carries out a process according to the instruction.

The projection system 1 includes a projector 2, a pointing element 3, a screen SC, and an image generator (not shown), as shown in FIG. 1. Among these components, the projector 2 is supported by a holder 41 of a fixture 4, which fixes the projector 2, for example, in a predetermined position (wall section WL in present embodiment), and fixed above and in front of the screen SC. A surface of the screen SC, the surface facing the projector 2, is used as a screen surface SS.

It is assumed that the screen SC is so disposed as to extend in the vertical direction, as shown in FIG. 1, but the screen SC may be so disposed as to extend in the direction perpendicular to the vertical direction (horizontal direction).

The projector 2 projects a projection image on the screen surface SS. The projection image contains an image drawn in the projector 2, in a case where no image is drawn in the projector 2, the projector 2 radiates light on the screen surface SS to display a white image.

In the following description, the screen surface SS means a surface of a member, the surface on which an image is projected. Further, a projection area PS means an area of an image projected by the projector 2 on the screen surface SS. Part of the screen surface SS is therefore typically set as the projection area PS.

The pointing element 3 means one of a self-luminous pointing element 31, which emits light by itself, and a non-luminous pointing element 32. Out of the two components, the self-luminous pointing element 31 is a pen-shaped pointing element and includes a front-end section 311, a shaft section 312, and a button switch 313. The front-end section 311 is configured to be capable of emitting light, and the shaft section 312 is a portion held by a user. When the button switch 313 is pressed, the front-end section 311 emits light. The configuration and function of the self-luminous pointing element 31 will be described later in detail.

The projection system 1 is configured to allow the user to use one or more self-luminous pointing elements 31 and one or more non-luminous pointing elements 32 (such as non-luminous pens and fingers)

Although will be described later in detail, the projection system 1 according to the present embodiment is partly characterized in that a first detection light radiating section 251 in the projector 2, which forms the projection system 1, is so configured that the distance from the first detection light radiating section 251 to a second detection light radiating section 252 is changeable.

Figure 2:
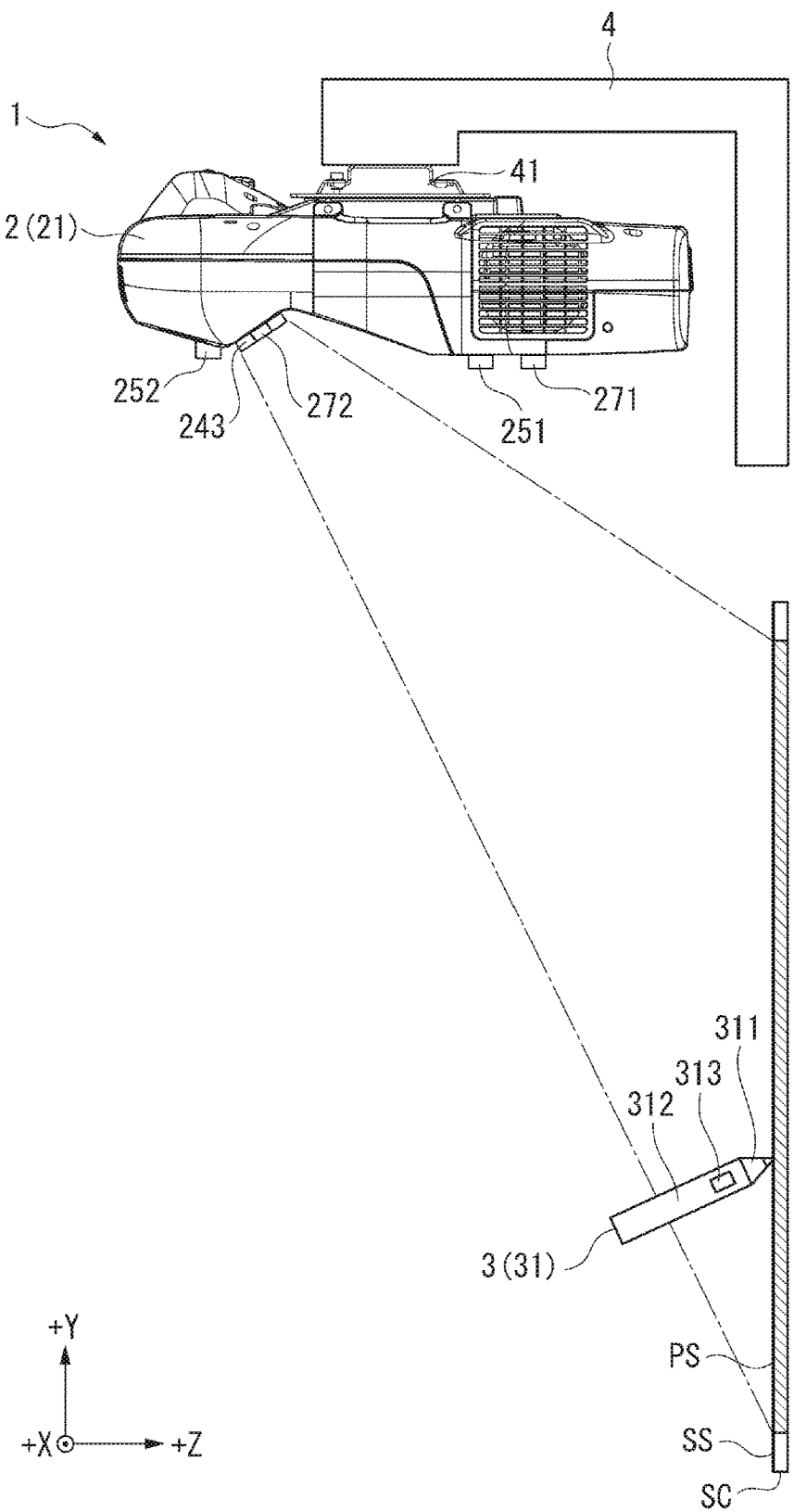
FIG. 2 is a side view showing the projection system according to the first embodiment.
Figure 3:
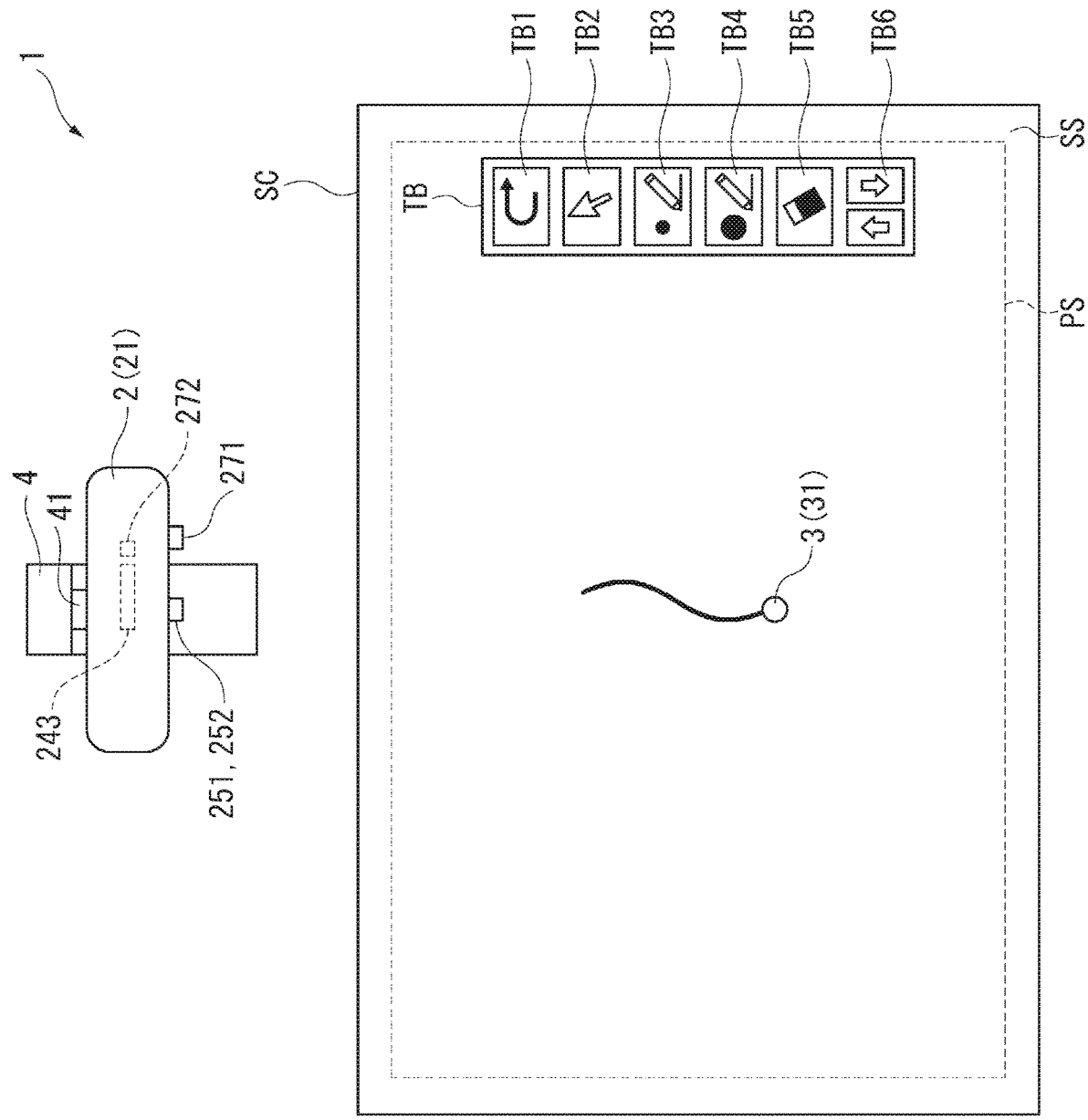
FIG. 3 is a front view showing the projection system according to the first embodiment.

FIG. 2 is a side view showing the system 1, and FIG. 3 is a front view showing the system 1. In FIG. 2, the projection area PS, which forms the screen SC and where a projection image is displayed, is hatched for ease of description.

The projector 2 includes an exterior enclosure 21. The exterior enclosure 21 is provided with a projection lens 243, which projects a projection image on the screen surface SS, the first detection light radiating section 251 and the second detection light radiating section 252, each of which outputs detection light (near-infrared light, for example) and a first camera 271 and a second camera 272, each of which captures an image of the projection area PS.

The example in FIG. 3 shows that the system 1 operates in a whiteboard mode. The whiteboard mode is a mode that allows the user to perform arbitrary drawing in the projection area PS by using the self-luminous pointing element 31 or the non-luminous pointing element 32. A projection image containing a toolbox TB is projected on the screen surface SS.

The toolbox TB includes a cancel button TB1, which allows the user to return to the preceding process, a pointer button TB2, which allows the user to select a mouse pointer, pen buttons TB3 and TB4, each of which allows the user to select a pen tool for drawing, an eraser button TB5, which allows the user to select an eraser tool that erases a drawn image, and a forward/rearward button TB6, which allows the user to move the image screen forward or backward. The user can use the pointing element 3 to click any of the buttons to carry out a process according to the button or select a tool. It is noted that immediately after the system 1 is powered on, the mouse pointer may be selected as a default tool.

The example shown in FIG. 3 shows that after selecting one of the pen tools, the user moves the front-end section 311 of the self-luminous pointing element 31 within the projection area PS with the front-end section 311 being in contact with the screen surface SS to draw a line in the projection area PS. The line drawing operation is performed by a projection image generating section 23 (see FIG. 4) in the projector 2.

The system 1 can operate in a mode other than the whiteboard mode. For example, the system 1 can operate in a PC interactive mode in which an image showing data transferred from the image generator described above (not shown), such as a personal computer, via a communication line is displayed as a projection image. In the PC interactive mode, image showing data, for example, in spreadsheet software is displayed, and a variety of tools and icons displayed in the image can be used to input, create, correct, or otherwise process the data.

Configuration of Projector

Figure 4:
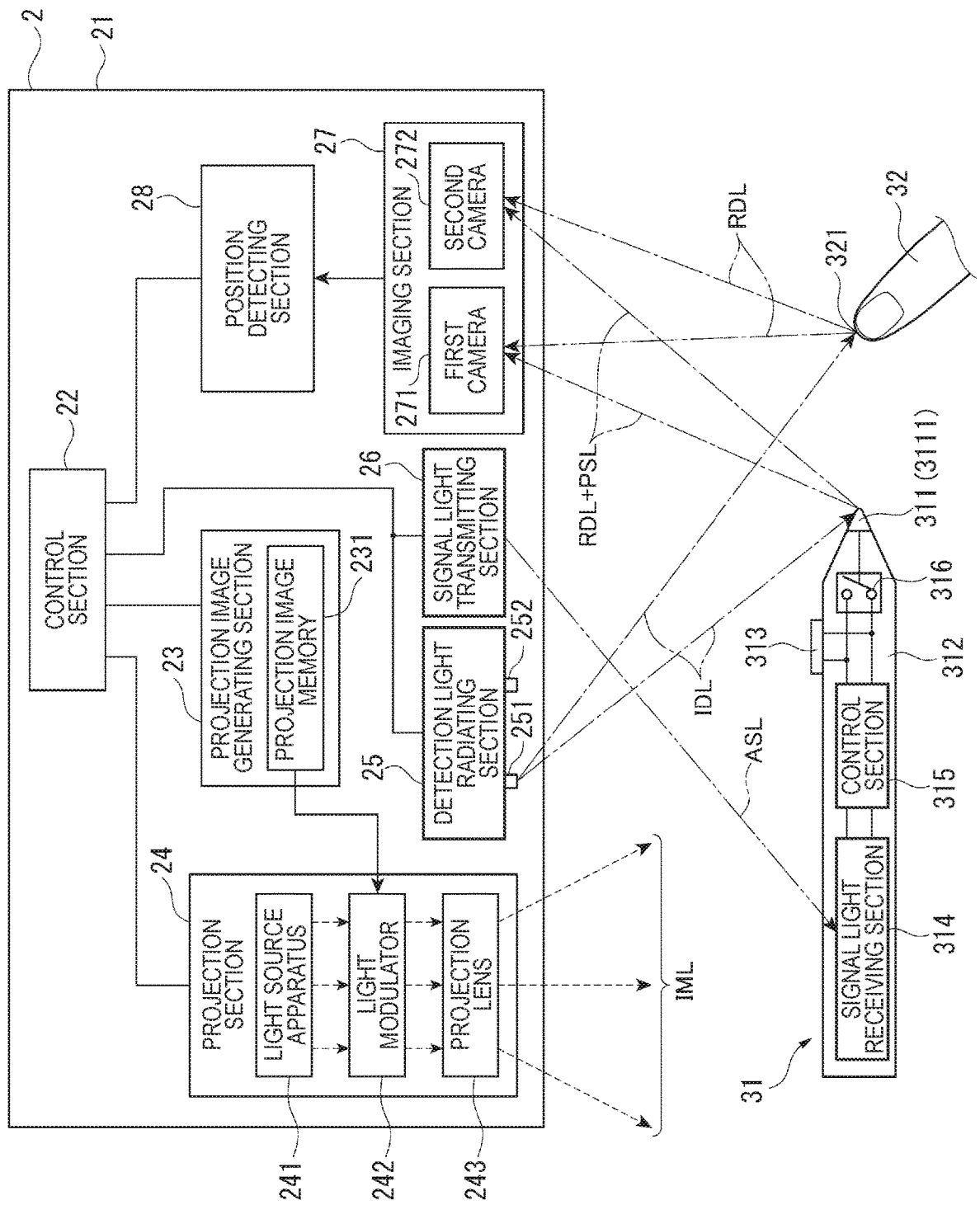
FIG. 4 is a block diagram showing the internal configuration of the projector and a self-luminous pointing element according to the first embodiment.

FIG. 4 is a block diagram showing the internal configuration of the projector 2 and the self-luminous pointing element 31.

The projector 2 includes a control section 22, a projection image generating section 23, a projection section 24, a detection light radiating section 25, a signal light transmitting section 26, an imaging section 27, and a position detecting section 28, as shown in FIG. 4. The sections 22 to 28 are arranged in the exterior enclosure 21.

The control section 22 controls the sections 23 to 28 arranged in the projector 2. The control section 22 further evaluates the content of an instruction issued on the projection area PS by the pointing element 3 detected by the position detecting section 28. The control section 22 further causes the projection image generating section 23 to generate an image to be projected as a projection image in accordance with the content of the instruction.

The projection image generating section 23 generates a projection image to be projected by the projection section 24 on the screen surface 33. The projection image generating section 23 includes a projection image memory 231, which stores projection images, and the projection image memory 231 stores a generated projection image and an image showing data transferred from the image generator described above via the communication line. The projection image generating section also functions as a keystone correction section that corrects trapezoidal distortion of the projection area PS (projection image).

The projection section 24 acquires a projection image generated by the projection image generating section 23 and stored in the projection image memory 231 and projects the projection image on the screen surface SS. The projection section 24 corresponds to the projection optical apparatus in an aspect of the invention and includes the projection lens 243, which has been described with reference to FIG. 2, a light source apparatus 241, and a light modulator 242.

The light source apparatus 241 outputs light toward the light modulator 242. The thus configured light source apparatus 241 is formed of a light source lamp, such as an ultrahigh-pressure mercury lamp, a reflection mirror, and a parallelizing lens in the present embodiment. The light source apparatus 241 does not necessarily have the configuration described above, and any of a variety of other light sources, such as a light emitting diode and a laser diode, can be employed.

The light modulator 242 modulates light from the light source apparatus 241 in accordance with projection image data acquired from the projection image memory 231 to form projection image light IML. The projection image light IML is color image light containing visible light formed of three color light fluxes, red (R), green (G), and blue (B) light fluxes, and is projected by the projection lens 243 on the screen surface SS. In the present embodiment, the light modulator 242 is formed of a transmissive liquid crystal panel. The light modulator 242 does not necessarily have the configuration described above, and a reflective liquid crystal panel, a digital mirror device, or any other component can be employed. Further, a plurality of light modulators may be provided on a color light basis.

The detection light radiating section 25 includes the first detection light radiating section 251 and the second detection light radiating section 252 described above. The detection light radiating sections 251 and 252 correspond to the plurality of detection light radiators in an aspect of the invention and each radiate radiated detection light IDL (hereinafter simply referred to as detection light in some cases), which is used to detect the front-end section of the pointing element 3 (self-luminous pointing element 31 and non-luminous pointing element 32), onto the screen surface SS (irradiated area) and through the space in front of the screen surface SS. The radiated detection light IDL can, for example, be near-infrared light.

The first and second detection light radiating sections 251, 252 radiate the radiated detection light IDL only in a predetermined period including the imaging timings of the first and second cameras 271, 272 but do not radiate the radiated detection light IDL in the other periods. Instead, the first and second detection light radiating sections 251, 252 may be maintained in a state in which they always radiate the radiated detection light IDL during the operation of the system 1.

The configurations of the first detection light radiating section 251 and the second detection light radiating section 252 will be described later in detail.

The signal light transmitting section 26 transmits an apparatus signal light ASL, which is received by the self-luminous pointing element 31. Specifically, the apparatus signal light ASL is a near-infrared signal for synchronization, and the signal light transmitting section 26 regularly transmits the apparatus signal light ASL to the self-luminous pointing element 31.

The imaging section 27 corresponds to the imager in an aspect of the invention and includes the first camera 271 and the second camera 272 described above. The two cameras 271 and 272 receive and image light that belongs to a wavelength region containing the wavelength of the detection light. Out of the two cameras, the first camera 271 is located in the vicinity of the first detection light radiating section 251 in the exterior enclosure 21, and the second camera 272 is located in the vicinity of the second detection light radiating section 252 (projection lens 243) in the exterior enclosure 21, as shown in FIGS. 1 to 3. That is, the first camera 271 is located in a position shifted from the second camera 272 toward the projection area PS.

The first and second cameras 271, 272 receive and image reflected detection light RDL, which is the radiated detection light IDL radiated by the detection light radiating section 25 (first detection light radiating section 251 and second detection light radiating section 252) and reflected off the pointing element 3 (self-luminous pointing element 31 and non-luminous pointing element 32), as shown in FIG. 4. The first and second cameras 271, 272 further receive and image pointing element signal light PSL, which is the near-infrared light emitted from a front-end light emitter 3111 of the self-luminous pointing element 31. The imaging operation performed by the first and second cameras 271, 272 is performed in both a first period for which the radiated detection light IDL emitted from the detection light radiating section 25 is in an ON state (light emission state) and a second period for which the radiated detection light IDL is in an OFF state (non-light emission state).

At least one of the first and second cameras 271, 272 may further have a second imaging function of receiving and imaging light containing visible light and switch one of the two imaging functions to the other. For example, the first and second cameras 271, 272 may each include a near-infrared filter switching mechanism (not shown) capable of placing a near-infrared filter, which blocks visible light but transmits only near-infrared light, in front of a lens and retracting the near-infrared filter from the position in front of the lens. The near-infrared filter switching mechanism allows the cameras 271 and 272 to capture images projected on the project ion area PS of the screen surface SS, and the images can be used to allow the projection image generating section 23 to perform keystone correction.

The position detecting section 28 corresponds to the position detector according to an aspect of the invention and uses images captured by the first and second cameras 271, 272 along with triangulation to determine the three-dimensional position of the front-end section of the pointing element 3 (self-luminous pointing element 31 or non-luminous pointing element 32), that is, detects the position of the pointing element 3.

The position detecting section 28 compares images captured in the two periods described above (first and second periods) with each other to determine whether the pointing element 3 contained in the images is the self-luminous pointing element 31 or the non-luminous pointing element 32 Specifically, the position detecting section 28 uses a light emission pattern of the light emitted from the self-luminous pointing element 31 to determine whether each of the pointing element in the images is the self-luminous pointing element 31 or the non-luminous pointing element 32.

The self-luminous pointing element 31 is provided with not only the front-end section 311, the shaft section 312, and the button switch 313 but a signal light receiving section 314, a control section 315, and a front-end switch 316, and the front-end section 311 is provided with the front-end light emitter 3111.

The signal light receiving section 314 receives the apparatus signal light ASL transmitted from the signal light transmitting section 26 of the projector 2.

The front-end switch 316 is a switch that is turned on when the front-end section 311 of the self-luminous pointing element 31 is pressed and turned off when the front-end section 311 is released. The front-end switch 316 is normally in the turned-off state and transitions to the turned-on state when the front-end section 311 of the self-luminous pointing element 31 comes into contact with the screen surface SS and the contact pressure is applied to the front-end switch 316.

When the front-end switch 316 is in the turned-off state, the control section 315 causes the front-end light emitter 3111 to emit light having a specific first light emission pattern indicating that the front-end switch 316 is OFF or the pointing element signal light PSL having the first light emission pattern. On the other hand, when the front-end switch 316 transitions to the turned-on state, the control section 315 causes the front-end light emitter 3111 to emit light having specific second light emission pattern indicating that the front-end switch 316 is in the turned-on state or the pointing element signal light PSL having the second light emission pattern. Since the first and second light emission patterns differ from each other, the position detecting section 28 analyzes images captured by the two cameras 271 and 272 to identify whether the front-end switch 316 is in the turned-on state or the turned-off state.

As described above, in the present embodiment, whether or not the front-end section 311 of the self-luminous pointing element 31 is in contact with the screen surface SS is determined in accordance with whether the front-end switch 316 is in the turned-on state or the turned-off state. On the other hand, the three-dimensional position of the front-end section 311 of the self luminous pointing element 31 can be determined by triangulation using images captured by the two cameras 271 and 272. Whether the front-end section 311 of the self-luminous pointing element 31 is in contact with the screen surface SS may therefore instead be determined by using the three-dimensional position. The accuracy of triangulation detection of the coordinates in the direction of a normal to the screen surface SS is, however, not always satisfactory in some cases. The contact determination can therefore be performed with accuracy in accordance with whether the front-end switch 316 is in the turned-on state of the turned-off state.

The button switch 313 of the self-luminous pointing element 31 has the same function as that of the front-end switch 316. The control section 315 therefore causes the front-end light emitter 3111 to emit light having the second light emission pattern described above when the user presses the button switch 313 and causes the front-end light emitter 3111 to emit light having the first light emission pattern described above when the user does not press the button switch 313. In other words, the control section 315 causes the front-end light emitter 3111 to emit light having the second light emission pattern when at least one of the front-end switch 316 and the button switch 313 is turned on and causes the front-end light emitter 3111 to emit light having the first light emission pattern when both the front-end switch 316 and the button switch 313 are turned off.

A function different from the function of the front-end switch 316 may be assigned to the button switch 313. For example, in a case where the same function as that of the right click button of a mouse is assigned to the button switch 313, when the user presses the button switch 313, the instruction issued by right clicking is transmitted to the control section 22 of the projector 2, and a process according to the instruction is carried out. In the case where a function different from the function of the front-end switch 316 is assigned to the button switch 313, the front-end light emitter 3111 emits light having any of four light emission patterns different from one another in accordance with whether the front-end switch 316 in in the turned-on state or the turned-off state and whether the button switch 313 is in the turned-on state or the turned-off state. In this case, the self-luminous pointing element 31 distinguishes the four combinations of the turned-on/turned-off states of the front-end switch 316 and the button switch 313 and can transmit a relevant instruction to the projector 2.

Figure 5:
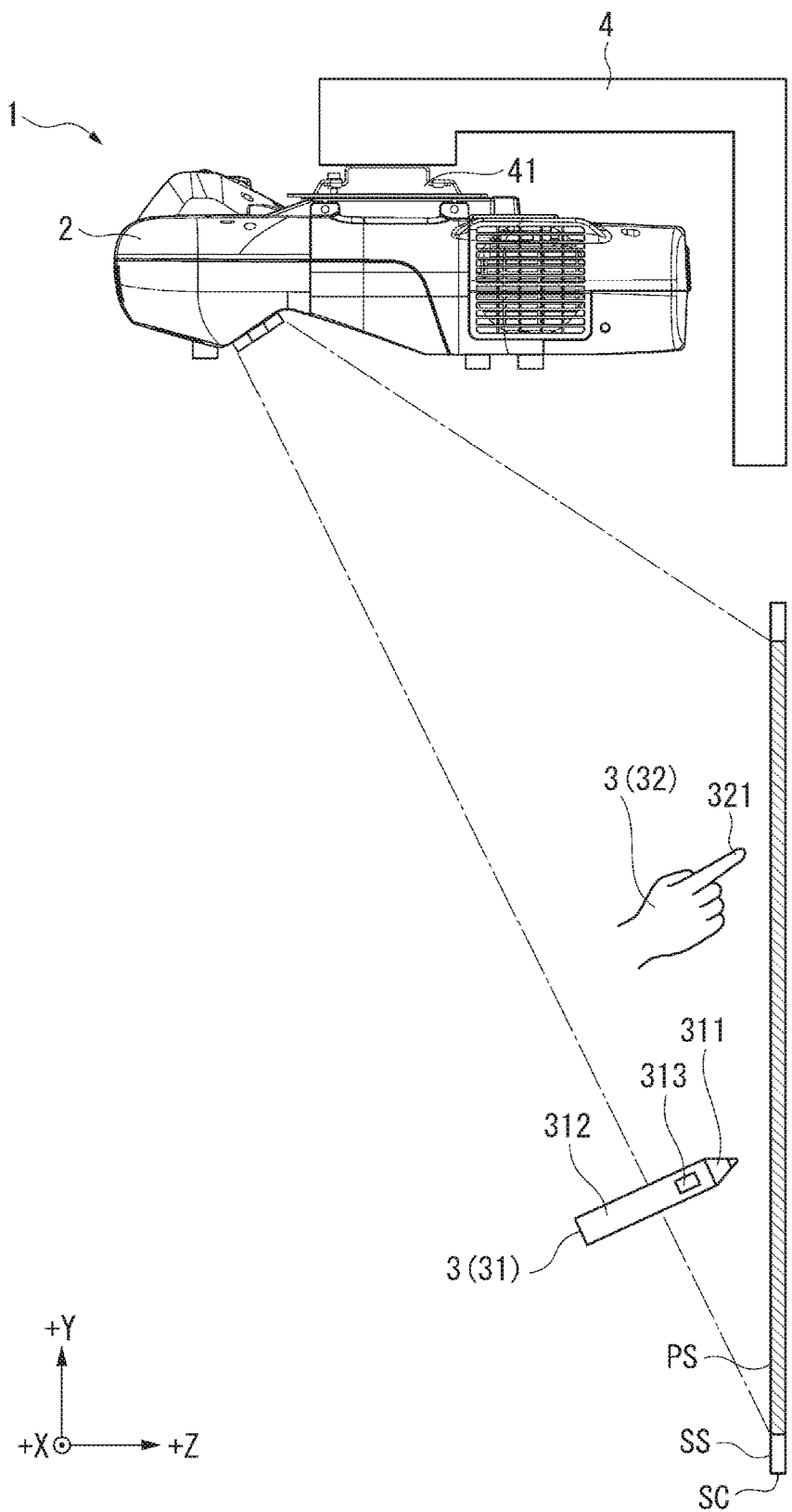
FIG. 5 shows an example of an operation aspect using a self-luminous pointing element and a non-luminous pointing element according to the first embodiment.
Figure 6:
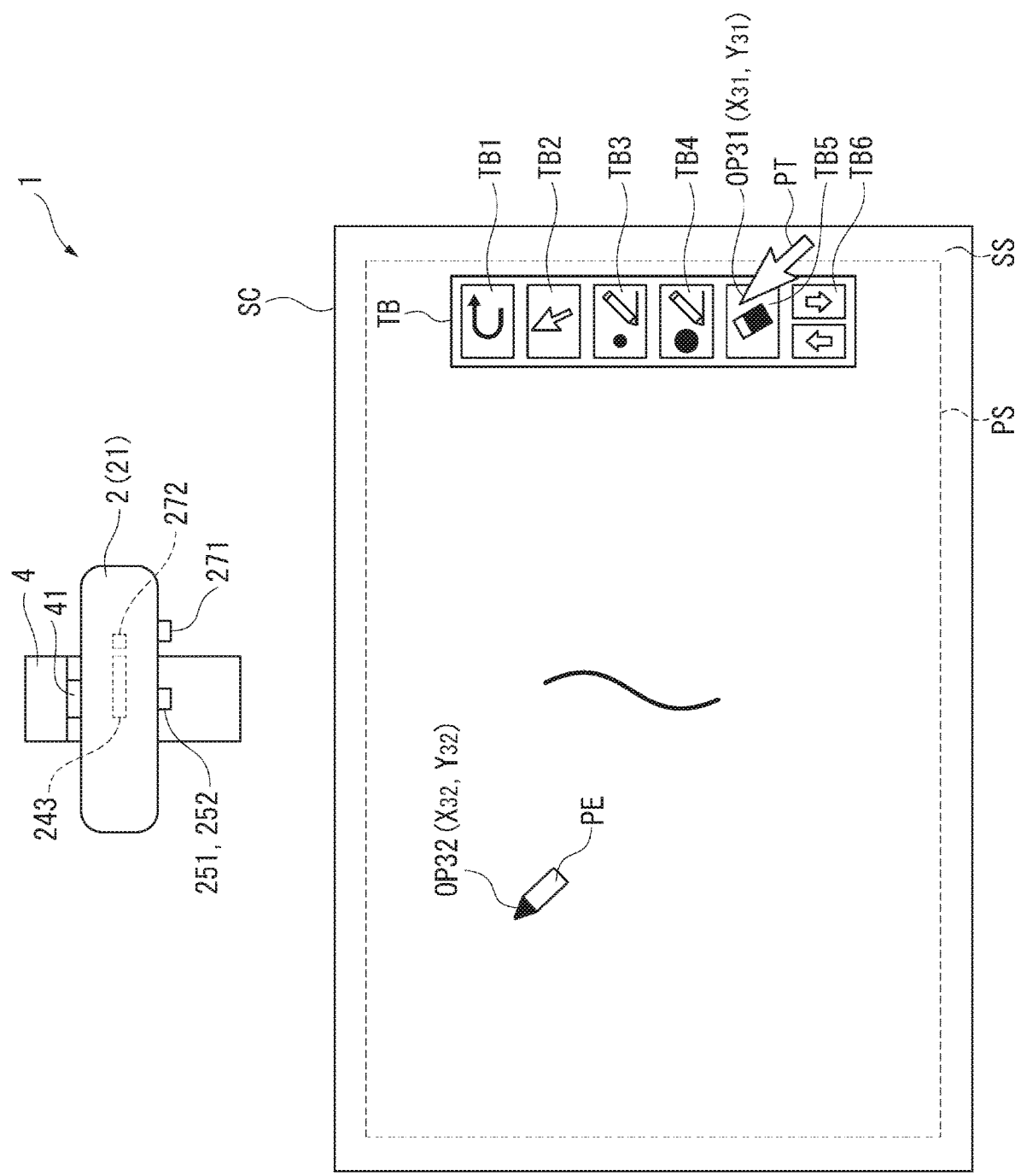
FIG. 6 shows an example of an operation aspect using the self-luminous pointing element and the non-luminous pointing element according to the first embodiment.

FIGS. 5 and 6 show operation using the self-luminous pointing element 31 and the non-luminous pointing element 32.

In the following description, it is assumed that the depth direction of the screen SC is a +Z direction, and that the directions perpendicular to the +Z direction are a +X direction and a +Y direction. Specifically, the +X direction is the direction from the left side toward the right side of the screen SC, and the +Y direction is the direction from the lower side toward the upper side of the screen SC. It is further assumed that the direction opposite the depth direction of the screen SC is a −Z direction, and the same holds true for −X and −Y directions.

The front-end section 311 of the self-luminous pointing element 31 and a front-end section 321 of the non-luminous pointing element 32 are both separate from the screen surface SS, as shown in FIG. 5. The XY coordinates $(X_{31}, Y_{31})$ of the front-end section 311 of the self-luminous pointing element 31 fall within the area of the eraser button TB5 in the toolbox TB. In the description, it is assumed that the mouse pointer PT has been selected as the tool representing the function of the front-end section 311 of the self-luminous pointing element 31, and that the mouse pointer PT is drawn in a projection image projected in the projection area PS in such a way that an operation point OP31 of the mouse pointer PT is located on the eraser button TB5.

The three-dimensional position of the front-end. section 311 of the self-luminous Pointing element 31 is determined by triangulation using images captured by the two cameras 271 and 272, as described above. Therefore, in the projection area PS, out of the three-dimensional coordinates $(X_{31}, Y_{31}, Z_{31})$ of the front-end section 311 determined by the triangulation, the mouse pointer PT is so drawn that the operation point OP31 at the front end of the mouse pointer PT is located in the position represented by the XY coordinates $(X_{31}, Y_{31})$. That is, the operation point OP31 of the mouse pointer PT is located at the XY coordinates $(X_{31}, Y_{31})$ out of the three-dimensional coordinates $(X_{31}, Y_{31}, Z_{31})$ of the front-end section 311 of the self-luminous pointing element 31, and the user issues an instruction in this position. For example, in this state, the user can select the eraser tool by pressing the button switch 313 of the self-luminous pointing element 31. As described above, in the present embodiment, even when the self-luminous pointing element 31 is separate from the screen surface SS, pressing the button switch 313 allows to the projector 2 an instruction according to the content shown in the projection area PS and pointed by the operation point OP31, disposed in the XY coordinates $(X_{31}, Y_{31})$, of the front-end section 311.

A pen tool PE is selected as the tool representing the function of the front-end section 321 of the non-luminous pointing element 32, as shown in FIG. 6, and the pen tool PE is drawn in the projection area PS. The three-dimensional position of the front-end section 321 of the non-luminous pointing element 32 is also determined by triangulation using images captured by the two cameras 271 and 272, as described above. Therefore, in the projection area PS, out of the three-dimensional coordinates $(X_{32}, Y_{32}, Z_{32})$ of the front-end section 321 determined by the triangulation, the pen tool PE is so drawn that an operation point OP32 at the front end of the pen tool PE is located in the position represented by the XY coordinates $(X_{32}, Y_{32})$.

When the user uses the non-luminous pointing element 32 to issue an instruction to the projector 2, the instruction (such as drawing and tool selection) is issued with the front-end section 321 of the non-luminous pointing element 32 being in contact with the projection area PS.

As described above, in the examples shown in FIGS. 5 and 6, even when the front-end section of the pointing element (self-luminous pointing element 31 or non-luminous pointing element 32) is separate from the projection area. PS (screen surface SS), a tool (mouse pointer PT or pen tool PE) selected by the pointing element 3 is drawn and displayed in the projection area PS. Therefore, even when the user does not cause the front-end section of the pointing element 3 to be in contact with the projection area PS, a tool selected by the pointing element 3 is readily grasped, and operation can be readily performed. Further, since a tool is so drawn that the operation point OP of the tool is located in the position represented by the XY coordinates out of the three-dimensional ordinates of the front-end section of the pointing element, the user can appropriately recognize the position of the tool in use.

The protection system 1 may be so configured that a plurality of self-luminous pointing elements 31 are simultaneously usable. In this case, the light emission pattern of the pointing element signal light PSL described above is preferably a unique light emission pattern that allows identification of the corresponding one of the plurality of self-luminous pointing elements 31. Specifically, in a case where N (N is integer greater than or equal to 2) self-luminous pointing elements 31 are simultaneously usable, the light emission pattern of the pointing element signal light PSL preferably allows distinction among the N self-luminous pointing elements 31. In a case where one light emission pattern contains a plurality of unit light emission periods, two values representing light emission and no light emission can be expressed in one unit light emission period. One unit light emission period corresponds to a period in which the front-end light emitter 3111 of the self-luminous pointing element 31 expresses information formed of one bit representing ON and OFF. In a case where one light emission pattern is formed of M (M is integer greater than or equal to 2) unit light emission periods, one light emission pattern allows distinction among 2M states. The number M of unit light emission periods that form one light emission pattern is preferably so set as to satisfy the following Expression (1)

$$N \times Q \leq 2^M \qquad (1)$$

In Expression (1), Q represents the number of states distinguished by the states of the switches 313 and 316 of the self-luminous pointing element 31, and Q=2 or Q=4 in the present embodiment. For example, in the case of Q=4, M is preferably set at an integer greater or equal to 3 when N=2, and M is preferably set at an integer greater or equal to 4 when N=3 or 4. Under the preferable setting described above, when the position detecting section 28 (or the control section 22) distinguishes the N self-luminous pointing elements 31 and the states of the switches 313 and 316 of each of the self-luminous pointing elements 31, the position detecting section 28 (or the control section 22) performs the distinction by using M images captured by each of the cameras 271 and 272 in the M unit light emission periods that form one light emission pattern. The M-bit light emission pattern is a pattern in which the pointing element signal light PSL is set at ON or OFF with the radiated detection light IDL maintained OFF, and the non-luminous pointing element 32 is not contained in the images captured by the first and second cameras 271, 272.

Therefore, to capture an image used to detect the position of the non-luminous pointing element 32, it is preferably to further add a one-bit unit light emission period in which the radiated detection light IDL is ON. It is, however, noted that in the unit light emission period for the position detection, the pointing element signal light PSL may be either ON or OFF. An image produced in the unit light emission period for the position detection can also be used to detect the position of the self-luminous pointing element 31.

In the present embodiment, the detection of the positions of the front-end sections 311 and 312 of the self-luminous pointing element 31 and the non-luminous pointing element 32 and determination of the content instructed by the self-luminous pointing element 31 and the non-luminous pointing element 32 are each performed as follows.

Overview of Method for Detecting Position of Self-luminous Pointing Element and Method for Determining Content of Instruction The three-dimensional position ($X_{31}$, $Y_{31}$, $Z_{31}$) of the front-end section 311 of the self-luminous pointing element 31 is determined by the position detecting section 28 on the basis of triangulation using images captured by the two cameras 271 and 272. In this process, whether or not the pointing element 3 is the self-luminous pointing element 31 is recognized by evaluation of whether or not the light emission pattern of the front-end light emitter 3111 appears in images captured at a plurality of predetermined timings. Further, whether or not the front-end section 311 of the self-luminous pointing element 31 is in contact with the screen surface SS (that is, whether front-end switch 316 is has been turned on or off) is also determined by using the light emission pattern of the front-end light emitter 3111 in the images captured at the plurality of timings.

The position detecting section 28 can further determine the content of the instruction in accordance with the ON/OFF state of each of the switches 313 and 316 of the self-luminous pointing element 31 and the content displayed on the screen surface SS and in the XY coordinates ($X_{31}$, $Y_{31}$) of the front-end section 311. For example, in a case where the front-end switch 316 is turned on with the position of the front-end section 311 represented by the XY coordinates ($X_{31}$, $Y_{31}$) is located on any of the buttons in the toolbox TB, as shown in FIG. 6, the tool associated with the button is selected. In the case where the XY coordinates ($X_{31}$, $Y_{31}$) of the front-end section 311 represent a position outside the toolbox TB in the projection area PS, as shown in FIG. 3, the process associated with the selected tool (drawing operation, for example) is selected. The control section 22 uses the XY coordinates ($X_{31}$, $Y_{31}$) of the front-end section 311 of the self-luminous pointing element 31 to cause the projection image generating section 23 to draw a preselected pointer or mark in such a way that the pointer or the mark is disposed in the position ($X_{31}$, $Y_{31}$) in the projection area PS. The control section 22 further carries out the process according to the content instructed by the self-luminous pointing element 31 to cause the projection image generating section 23 to draw an image containing a result of the process.

Overview of Method for Detecting Position of Non-Luminous Pointing Element and Method for Determining Content of Instruction The three-dimensional position ($X_{32}$, $Y_{32}$, $Z_{32}$) of the front-end section 321 of the non-luminous pointing element 32 is also determined by the triangulation using images captured by the two cameras 271 and 272. In this process, whether or not the pointing element 3 is the non-luminous pointing element 32 is recognized by evaluation of whether or not the light emission pattern of the self-luminous pointing element 31 appears in the images captured at the plurality of predetermined timings. The position of the front-end section 321 of the non-luminous pointing element 32 in two images captured by the two cameras 271 and 272 can be determined by using a known technology, such as template matching and feature extraction. For example, to recognize the front-end section 321 of the non-luminous pointing element 32, which is a finger, by using template matching, a plurality of templates relating to a finger are prepared in advance, and a portion that matches any of the templates is searched for in images captured by the two cameras 271 and 272. The front-end section 321, which is a finger, can thus be recognized.

Whether or not the front-end section 321 of the non-luminous pointing element 32 is in contact with the screen surface SS can be determined in accordance with whether or not the difference between the Z coordinate of the front-end section 321 determined by the triangulation and the Z coordinate of the screen surface SS is smaller than or equal to a minute allowance, that is, whether or not the front-end section 321 is sufficiently close to the screen surface SS. The allowance is preferably, for example, a small value ranging from about 2 to 6 mm. When the position detecting section 28 determines that the front-end section 321 of the non-luminous pointing element 32 is in contact with the screen surface SS, the position detecting section 28 determines the content of the instruction in accordance with the content displayed on the screen surface SS and in the contact position. The control section 22 uses the XY coordinates $(X_{32}, Y_{32})$ of the front end of the non-luminous pointing element 32 detected by the position detecting section 28 to cause the projection image generating section 23 to draw a preselected pointer or mark in such a way that the pointer or the mark is disposed in the position $(X_{32}, Y_{32})$ in the projection area PS. The control section 22 further carries out the process according to the content instructed by the non-luminous pointing element 32 to cause the projection image generating section 23 to draw an image containing a result of the process.

Configuration of Detection Light Radiating Section

Figure 7:
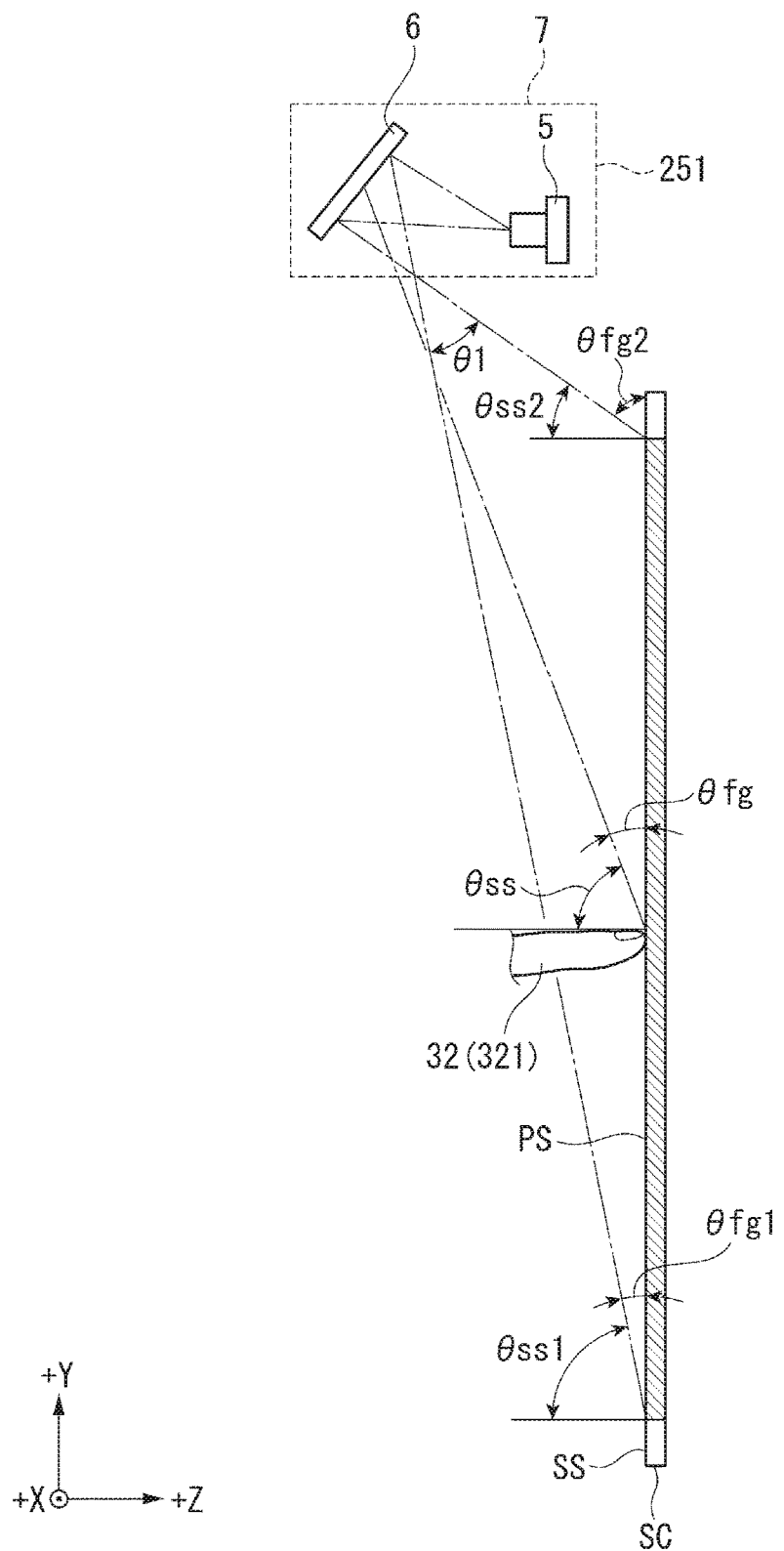
FIG. 7 shows the configuration of a detection light radiating section and the angle of incidence of detection light with respect to a projection area according to the first embodiment.

FIG. 7 is a descriptive diagram showing the configuration of the first detection light radiating section 251 and the angles of incidence θss and θfg of the radiated detection light. IDL outputted from the first detection light radiating section 251 and incident on the projection area PS and the non-luminous pointing element 32.

The first detection light radiating section 251 corresponds to the first detection light radiator according to an aspect of the invention and outputs detection light, such as infrared light, toward the projection area PS, as described above. The first detection light radiating section 251 includes a light source 5, a reflection mirror 6, and an enclosure 7, as shown in FIG. 7.

The light source 5 is located in a position closest to the +Z-direction side among the components in the enclosure 7, which will be described later, and emits the detection light toward the reflection mirror 6, which is located in a position shifted from the light source 5 toward the −Z-direction side in the enclosure 7 That is, the light source 5 emits the detection light toward the side opposite the projection area PS (−Z-direction side).

The thus configured light source 5 includes four LEDs (light emitting diodes) (not shown), and the four LEDs are arranged in a roughly rhombic shape when viewed in the direction along the +Z direction. Further, in the present embodiment, the light source 5 of the first detection light radiating section 251, which is close to the projection area PS, causes three of the four LEDs to be turned on, and the light source 5 of the detection light radiating section 252, which is far from the projection area PS, causes all the four LEDs to be turned on. The contrast in an image captured by the camera 272 is thus increased by increasing the intensity of the detection light outputted from the second detection light radiating section 252, which is farther from the projection area PS in the direction along the +Z direction than the first detection light radiating section 251.

The reflection mirror 6 is so positioned on the −Z-direction side of the light source 5 as to face the light source 5 and reflects the incident detection light toward the projection area PS. The reflection mirror 6 is a plate-shaped reflection mirror and is disposed in the enclosure 7 with the reflection mirror 6 inclining by 45° with respect to the light source 5 in the present embodiment.

The enclosure 7 accommodates the light source 5 and the reflection mirror 6. The enclosure 7 is so attached to the exterior enclosure 21 and in a position on the −Y-direction side thereof as to be movable along the +Z direction. The configuration of the enclosure 7 will be described later in detail.

In FIG. 7, the first detection light radiating section 251 has been described. The second detection light radiating section 252 also includes the light source 5, the reflection mirror 6, and the enclosure 7, as the first detection light radiating section 251 does, is fixed to the exterior enclosure 21 and in a position in the vicinity of the projection lens 243 described above, and outputs the detection light toward the projection area PS.

Characteristics of Detection Light Outputted from Detection Light Radiating Section The angles of incidence θss and θfg of the radiated detection light IDL in the position of the front end of the non-luminous pointing element 32 are each the angle with respect to a normal to a target light incident surface (projection area PS) as shown in FIG. 7. The angle of incidence θss of the radiated detection light IDL with respect to the projection area PS is characterized in that an angle of incidence θss2 in a case where the non-luminous pointing element 32 is located in an upper position (on +Y-direction side) is smaller than an angle of incidence θss1 in a case where the non-luminous pointing element 32 is located in a lower position (on −Y-direction side). On the other hand, the angle of incidence θfg of the radiated detection light IDL with respect to the non-luminous pointing element 32 is characterized in that an angle of incidence θfg2 in a case where the non-luminous pointing element 32 is located on the +Y-direction side is greater than an angle of incidenceθθfg1 in a case where the non-luminous pointing element 32 is located on the −Y-direction side. The relationships described above are expressed by the following Expressions (2) and (3)

$$\theta ss2 < \theta ss1 \quad (2)$$

$$\theta fg1 < \theta fg2 \quad (3)$$

On the other hand, the luminance of the projection area PS and the non-luminous pointing element 32 are expressed by the following Expressions (4) and (5).

$$Lss = (kss/\pi) \times (E \times \cos \theta ss) \quad (4)$$

$$Lfg = (kfg\pi) \times (E \times \cos \theta fg) \quad (5)$$

In Expression (4), Lss represents the luminance of the projection area PS (that is, screen surface SS), kss represents the reflectance of the radiated detection light IDL reflected off the screen surface SS, E represents illuminance at a surface perpendicular to the radiated detection light, and θss represents the angle of incidence of the radiated detection light IDL incident on the projection area PS. In Expression (5), Lfg represents the luminance of the non-luminous pointing element 32, kfg represents the reflectance of the radiated detection light IDL reflected off the non-luminous pointing element 32, and θfg represents the angle of incidence of the radiated detection light IDL incident on the non-luminous pointing element 32. When the angles of incidence θss and θfg increase, the luminance Lss and Lfg tend to decrease.

As apparent from Expressions (2) to (5) described above, as the non-luminous pointing element 32 travels in the +Y direction, the angle of incidence θss with respect to the projection area PS decreases and the intensity Rss of the light reflected off the projection area PS increases accordingly, whereas the angle of incidence θfg with respect to the non-luminous pointing element 32 increases and the luminance Lfg of the non-luminous pointing element 32 decreases accordingly. Therefore, in images of the reflected radiated detection light IDL captured by the cameras 271 and 272, there is a tendency in which the lightness of the non-luminous pointing element 32 is greater or smaller than the lightness of the projection area PS, which is the background of the non-luminous pointing element 32, in a −Y-direction-side area in the projection area PS, whereas the lightness of the non-luminous pointing element 32 is smaller or greater than the lightness of the projection area PS in a +Y-direction-side area in the projection area PS. The tendency described above is common to the first and second detection light radiating sections 251, 252.

Figure 8:
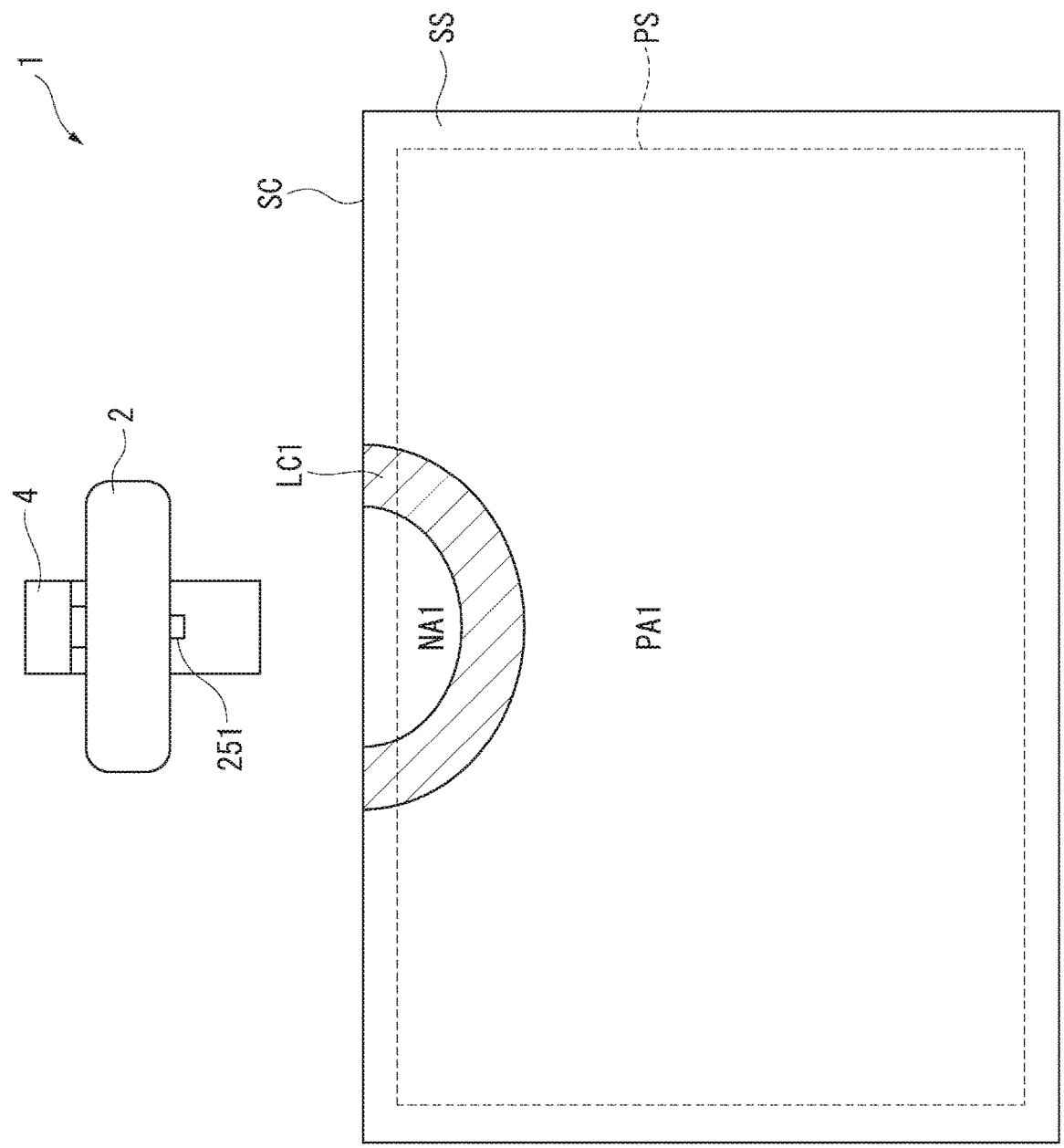
FIG. 8 shows comparison of the contrast between the projection area and the non-luminous pointing element based on the detection light radiated from a first detection light radiating section according to the first embodiment.
Figure 9:
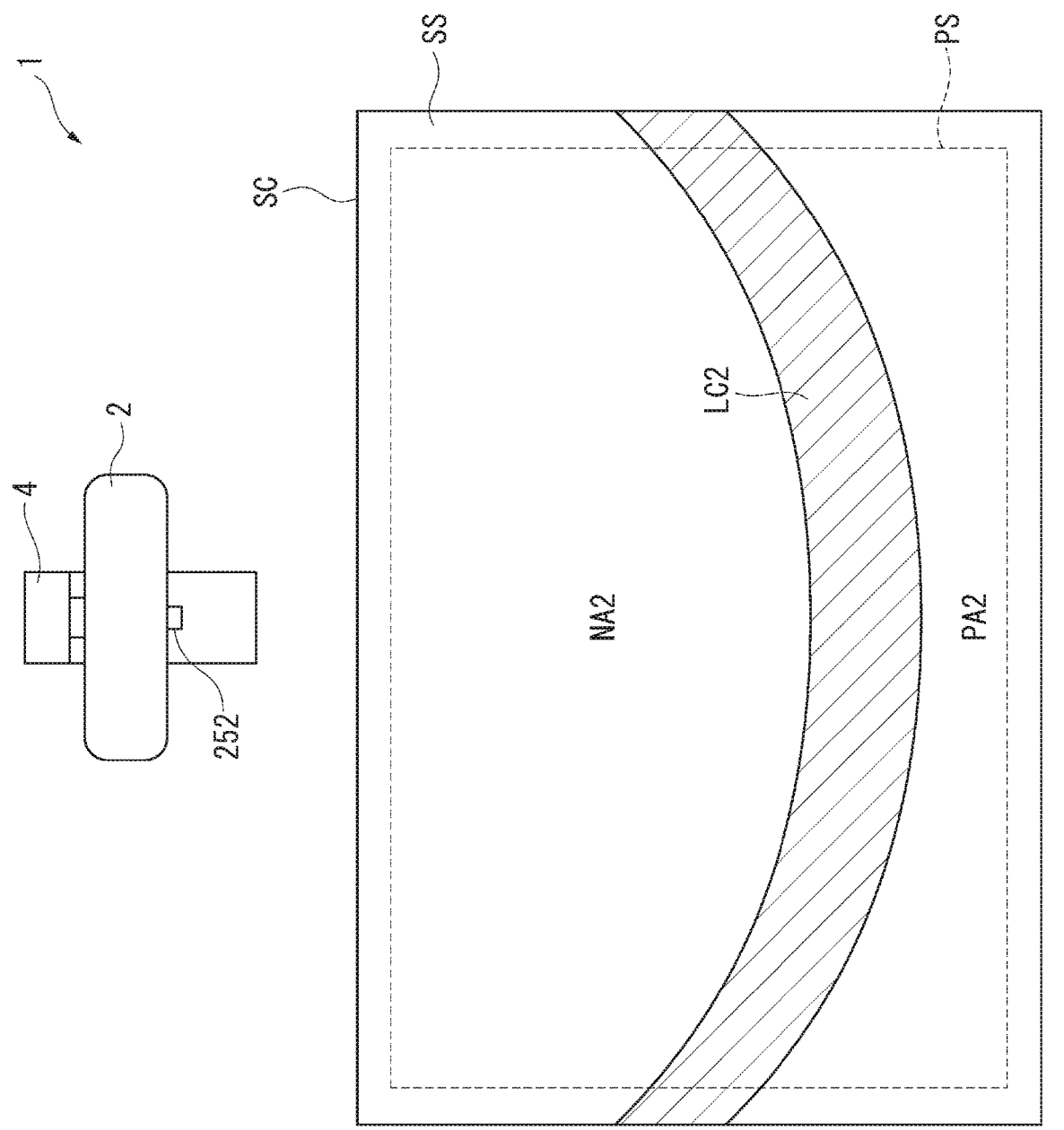
FIG. 9 shows comparison of the contrast between the projection area and the non-luminous pointing element based on the detection light radiated from a second detection light radiating section according to the first embodiment.

FIGS. 8 and 9 are descriptive diagrams showing comparison of the contrast between the projection area PS and the non-luminous pointing element 32 produced by the detection light radiated from the first detection light radiating section 251 and the second detection light radiating section 252, respectively. FIG. 8 shows the contrast distribution in an image, captured by the first camera 271, of the reflected detection light radiated only from the first detection light radiating section 251.

In this example, a positive contrast area PA1 is present in a lower portion of the projection area PS, a negative contrast area NA1 is present in a +Y-direction-side portion of the projection area PS, and a low contrast area LC1 is present between the positive contrast area PA1 and the negative contrast area NA1. The "positive contrast area PA1" is an area where the non-luminous pointing element 32 is brighter than the projection area PS and the contrast therebetween is greater than a prespecified threshold. The "negative contrast area NA1" is an area where the non-luminous pointing element 32 is darker than the projection area PS and the contrast therebetween is greater than the prespecified threshold. The "low contrast area LC1" is an area where the contrast between the non-luminous pointing element 32 and the projection area PS is smaller than or equal to the threshold. The threshold is a preset value for distinguishing the non-luminous pointing element 32 from the projection area PS in an image and is experimentally or empirically set in advance in accordance with a distinction method.

In each of the positive contrast area PA1 and the negative contrast area NA1, since the contrast between the non-luminous pointing element 32 and the projection area PS is sufficiently large, the non-luminous pointing element 32 can be distinguished from the projection area PS. On the other hand, in the low contrast area LC1, since the contrast between the non-luminous pointing element 32 and the projection area PS is small, it is possible that the non-luminous pointing element 32 cannot be distinguished from the projection area PS.

FIG. 9 shows the contrast distribution in an image, captured by the second camera 272, of the reflected detection light radiated only from the second detection light radiating section 252.

Also in this example, a positive contrast area PA2 is present in a lower portion of the projection area PS, a negative contrast area NA2 is present in a −Y-direction-side portion of the projection area PS, and a low contrast area LC2 is present between the positive contrast area PA2 and the negative contrast area NA2. The three areas NA2, LC2, and PA2 in FIG. 9 are, however, shifted toward the −Y-direction side as compared with the three areas NA1, LC1, and PA1 in FIG. 8. In other words, in FIG. 9, the negative contrast area NA2 in the upper portion of the projection area PS is wider than the negative contrast area NA1 in FIG. 8. The reason for this is that the fact that the second detection light radiating section 252 is farther from the projection area PS than the first detection light radiating section 251 in the direction of a normal to the projection area PS (direction along +Z direction) causes the angle of incidence θss of the radiated detection light IDL radiated from the second detection light radiating section 252 and incident on the projection area PS to be smaller than the angle of incidence θss of the radiated detection light IDL radiated from the first detection light radiating section 251 and incident on the projection area PS but causes the angle of incidence θfg of the radiated detection light IDL radiated from the second detection light radiating section 252 and incident on the non-luminous pointing element 32 to be greater than the angle of incidence θfg of the radiated detection light IDL radiated from the first detection light radiating section 251 and incident on the non-luminous pointing element 32.

The first and second detection light radiating sections 251, 252 are so disposed on the exterior enclosure 21 in such a way that the low contrast areas LC1 and LC2 do not overlap with each other in the projection area PS in FIGS. 8 and 9. That is, the low contrast area produced by the detection light from one of the first and second detection light radiating sections 251, 252 is the area which is produced by the detection light from the other detection light radiating section and where the contrast is greater than or equal to the threshold (positive contrast area or negative contrast area) Specifically, the low contrast area LC1 in FIG. 8 is located in the negative contrast area NA2 in FIG. 9, and the low contrast area LC2 in FIG. 9 is located in the positive contrast area PA1 in FIG. 8. As a result, in the state in which the front end of the non-luminous pointing element 32 is in contact with the projection area PS and in an arbitrary position thereof, the non-luminous pointing element 32 can be distinguished from the projection area PS. Further, the self-luminous pointing element 31 can also similarly be distinguished from the projection area PS.

Instead of the positive contrast areas PA1 and PA2, the negative contrast areas NA1 and NA2 may be used. The boundary between the areas shown in FIGS. 8 and 9 can be detected by calibration performed in advance. Further, the positions of these areas may be registered in a nonvolatile memory (not shown) in the position detecting section 28 (see FIG. 4) or the control section 22. Instead, the projection area PS is divided into two areas, an upper area and a lower area, and in a case where the first detection light radiating section 251 radiates the radiated detection light IDL, the lower area of the projection area PS may be used to distinguish the non-luminous pointing element 32 from the projection area PS, whereas in a case where the second detection light radiating section 252 radiates the radiated detection light IDL, the upper area of the projection area PS may be used to distinguish the non-luminous pointing element 32 from the projection area PS.

The positive contrast area PA1 in FIG. 8 and the negative contrast area NA2 in FIG. 9 overlap with each other, and the sign (positive or negative) of the contrast in FIG. 8 is opposite the sign (negative or positive) of the contrast in FIG. 9 in the overlapping portion. In this case, the first detection light radiating section 251 and the second detection light radiating section 252 may radiate the detection light toward the screen surface SS at timings different from each other in a time division manner, as shown in FIGS. 8 and 9. Using images captured at the timings different from each other as described above allows the non-luminous pointing element 32 and the self-luminous pointing element 31 to be distinguished from the projection area PS in any position in the projection area PS.

In images captured by the first and second cameras 271, 272 appear the same contrast area distributions as those shown in FIGS. 8 and 9. On the other hand, the present embodiment, since distances from the projection area PS to the first and second cameras 271, 272 in the direction along the +Z direction differ from each other, the contrast area distributions in images captured by the first and second cameras 271, 272 differ from each other. Further, the first and second detection light radiating sections 251, 252 are so arranged that the low contrast areas LC1 and LC2 do not overlap with each other, as shown in FIGS. 8 and 9, also in images captured by the first and second cameras 271, 272, as described above.

Instead, the first and second cameras 271, 272 may be so attached to the exterior enclosure 21 that the distances from the projection area PS to the first and second cameras 271, 272 in the −Z direction are equal to each other.

Figure 10:
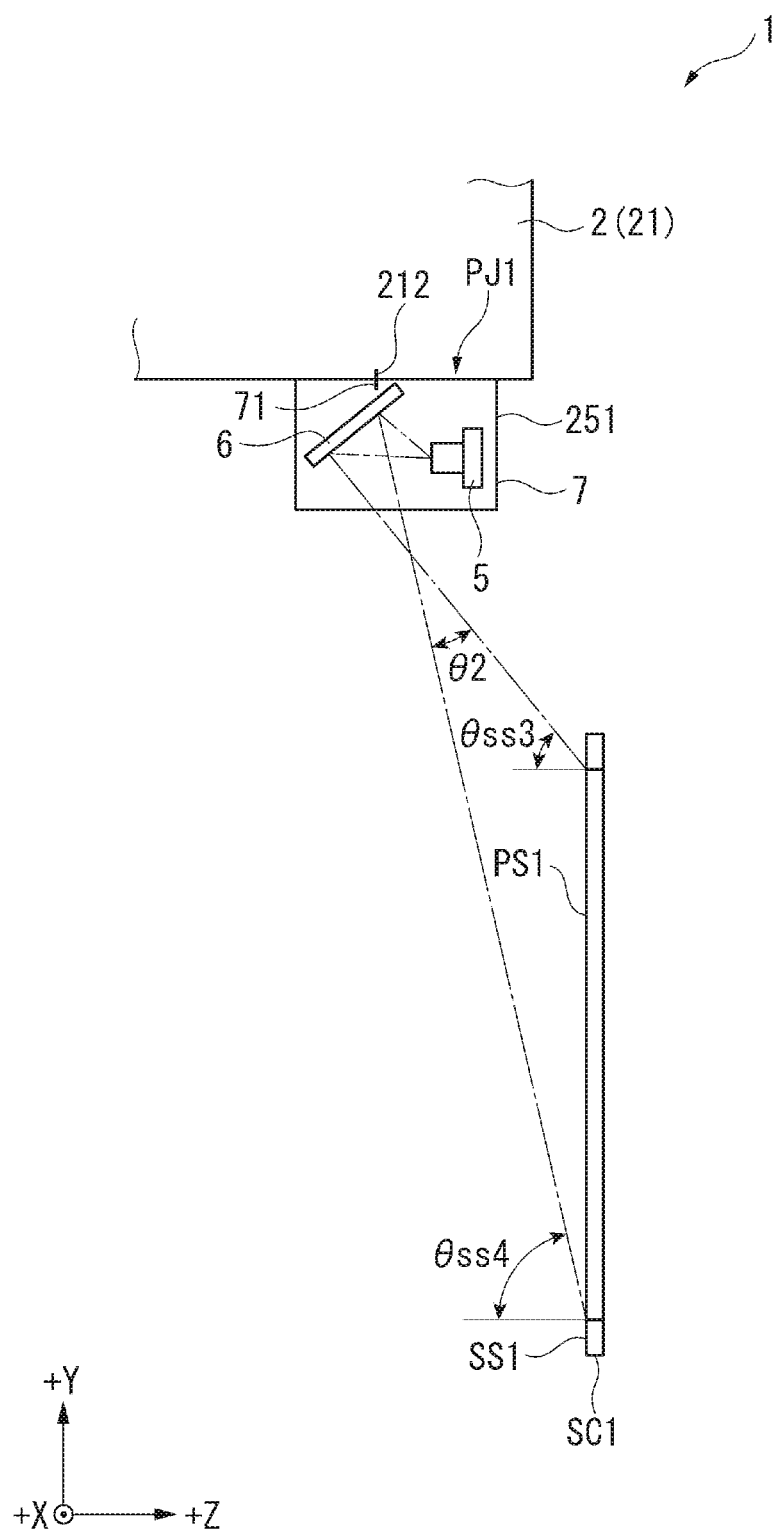
FIG. 10 shows an example in which the first detection light radiating section according to the first embodiment radiates the detection light onto a screen.
Figure 11:
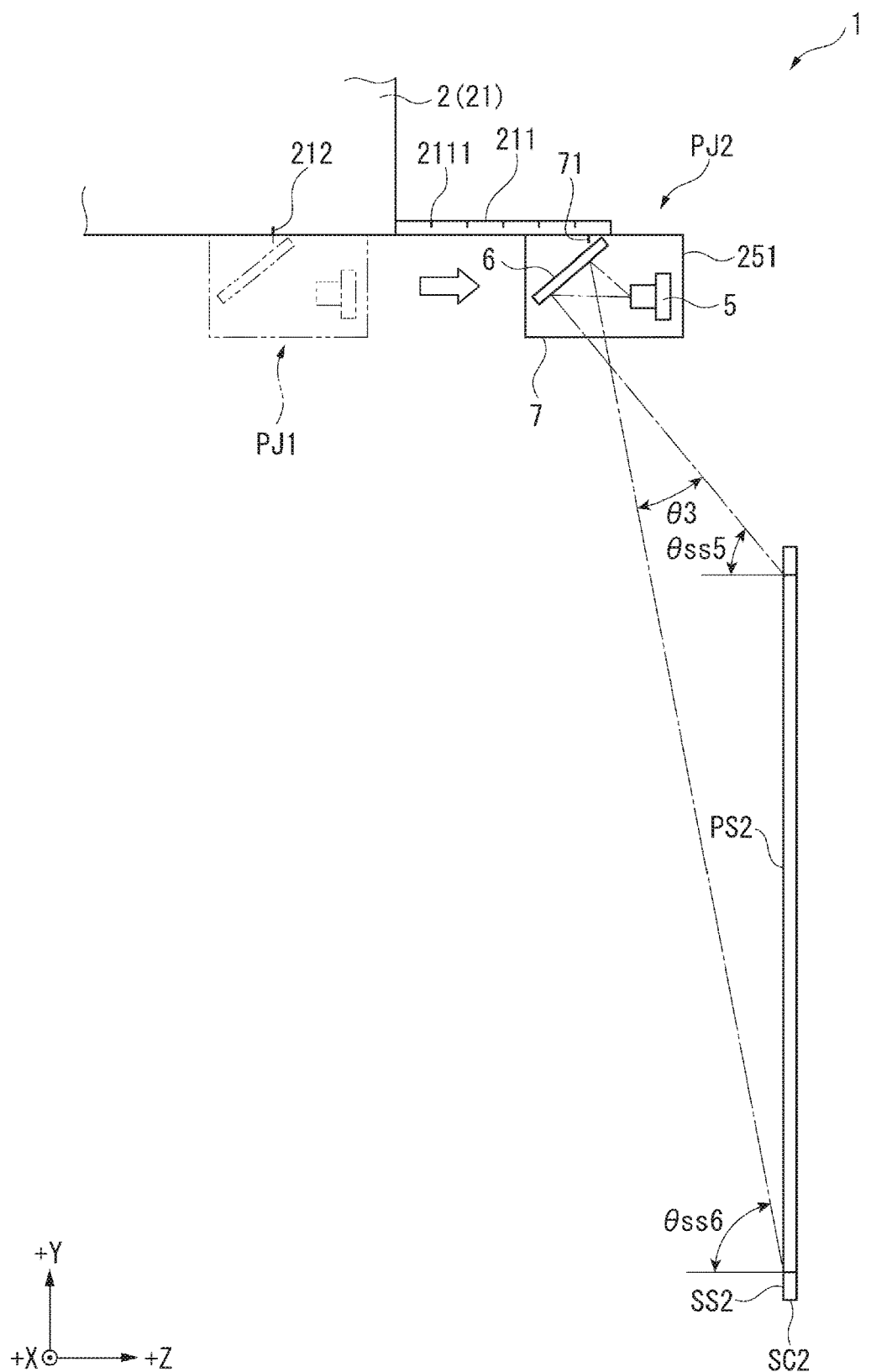
FIG. 11 shows an example in which the first detection light radiating section according to the first embodiment radiates the detection light onto a screen having a size different from the size of the screen.

FIG. 10 is a diagrammatic view showing an example in which the first detection light radiating section 251 radiates the detection light to a 60-inch screen SC1, and FIG. 11 is a diagrammatic view showing an example in which the first detection light radiating section 251 radiates the detection light to a 120-inch screen SC2. In FIGS. 10 and 11, the areas irradiated with the detection light are drawn by assuming that the projection area PS is irradiated with the detection light, but areas outside the screens SC1 and SC2 are also actually irradiated with the detection light.

The detection light radiated from the first detection light radiating section 251 is appropriately radiated onto a projection area PS1 of the screen surface SS of the 60-inch screen SC1, as shown in FIG. 10. That is, the first detection light radiating section 251 radiates the detection light onto the projection area PS1 in such a way that the low contrast area based on the first detection light radiating section 251 in the projection area PS1 does not overlap with the low contrast area based on the second detection light radiating section 252 in the projection area PS1.

When the first detection light radiating section 251 radiates the detection light from the position where the first detection light radiating section 251 can appropriately radiate the detection light onto the projection area PS1 of the 60-inch screen SC1 (hereinafter referred to as first position PJ1 in some cases) onto the projection area PS2 of the 120-inch screen SC2 shown in FIG. 11, the distance from the first detection light radiating section 251 to the projection area PS2 increases as compared with the case where the detection light is radiated onto the 60-inch projection area PS1 described above. The low contrast area based on the first detection light radiating section 251 in the projection area PS2 is therefore likely to overlap with the low contrast area based on the second detection light radiating section 252 in the projection area PS2. Further, the area irradiated with the detection light by the first detection light radiating section 251 is much greater than the irradiated area of the projection area PS1, resulting in a decrease in the intensity of the detection light in the projection area PS2. The brightness of a captured image of the pointing element 3 therefore decreases, and the pointing element 3 cannot be distinguished from the projection area PS2. Instead, the area irradiated with the detection light radiated from the first detection light radiating section 251 cannot reach part of the projection area PS2, undesirably resulting in creation of an area where the pointing element 3 cannot be detected.

In contrast, in the present embodiment, since the first detection light radiating section 251 is configured to be movable along the +Z direction (movable in the direction in which the first detection light radiating section 251 approaches the projection area PS2 or moves away therefrom), that is, the first detection light radiating section 251 is configured to be capable of changing the distance to the second detection light radiating section 252, the first detection light radiating section 251 can be moved to a position where the first detection light radiating section 251 can appropriately radiate the detection light onto the projection area PS2 of the 120-inch screen SC2 (hereinafter referred to as second position PJ2 in some cases), as shown in FIG. 11. As described above, moving the first detection light radiating section 251 from the first position PJ1 to the second position PJ2 prevents the low contrast areas described above in the projection area PS2 from overlapping from each other. The movement can further suppress decrease in the intensity of the detection light and prevent the detection light from not being projected onto part of the projection area PS2, whereby the same detection performance as that in the projection area PS1 can be maintained.

Specifically, the exterior enclosure 21 includes a slidable member 211, which is slidable in the direction along the +Z direction, and the first detection light radiating section 251 is attached to the slidable member 211. The first detection light radiating section 251 therefore moves in the +Z direction when the slidable member 211 is moved.

The exterior enclosure 21 is further provided with a marking 212 used to position the first detection light radiating section 251 in the first position PJ1 described above. The first detection light radiating section 251 can be disposed in the first position PJ1 by achieving the state in which the marking 212 coincides with a marking 71 provided on a +Y-direction-side end portion of the enclosure 7.

Further, the slidable member 211 is provided with a plurality of markings 2111. The plurality of markings 2111 are each set in accordance with the size of a screen (size of projection area where projection image is displayed) (markings set in accordance with screen size in increments of 10 inches, for example) The first detection light radiating section 251 can be disposed in the second position PJ2 by achieving the state in which the marking 2111 corresponding to the 120-inch screen out of the plurality of markings 2111 coincides with the marking 71 on the enclosure 7.

The second detection light radiating section 252 is close to the projection lens 243. Therefore, even when the second detection light radiating section 252 radiates the detection light onto each of the screens SC1 and SC2, the detection light irradiation ranges in the projection areas PS1 and PS2 are roughly equal to each other (in terms of position and size). The low contrast areas in the projection areas PS1 and PS2 based on the second detection light radiating section 252 therefore appear in the same position. In the present embodiment, the second detection light radiating section 252 is therefore not configured to be movable in the direction along. the +Z direction.

A description will now be made of the angular range and the angle of incidence of the detection light outputted from the first detection light radiating section 251 located in the first position PS1 and the second position PJ2 described above.

The angular range θ2 of the detection light outputted from the first detection light radiating section 251 located in the first position PJ1 is roughly equal to the angular range θ3 of the detection light outputted from the first detection light radiating section 251 located in the second position PJ2. The angle of incidence θss3 of the detection light outputted from the first detection light radiating section 251 located in the first position PJ1 and incident on the +Y-direction side in the projection area PS1 is therefore roughly equal to the angle of incidence θss5 of the detection light outputted from the first detection light radiating section 251 located in the second position PJ2 and incident on the +Y-direction side in the projection area PS2. Similarly, the angle of incidence θss4 of the detection light outputted from the first detection light radiating section 251 located in the first position PJ1 and incident on the −Y-direction side in the projection area PS1 is roughly equal to the angle of incidence θss6 of the detection light outputted from the first detection light radiating section 251 located in the second position PJ2 on the −Y-direction side in the projection area PS2.

As described above, in the present embodiment, the first position PJ1 and the second position PJ2 described above are set in positions where the angular range θ2 of the detection light outputted from the first detection light radiating section 251 toward the projection area PS1 of the 60-inch screen SC1 is roughly equal to the angular range θ3 of the detection light outputted from the first detection light radiating section 251 toward the projection area PS2 of the 120-inch screen SC2, that is, in positions where the low contrast areas described above do not overlap with each other. Further, the positions described above are also positions where the relative relationship between the detection light radiation range and the projection areas PS1 and PS2 is roughly fixed (in terms of position and size).

In addition to the first position PJ1 and the second position PJ2 described above, since the plurality of markings 2111 on the slidable member 211 are provided, the angular range θ of the detection light described above can be roughly unchanged as long as the size of the screen ranges from 60 to 120 inches by achieving the state in which any of the markings 2111 coincides with the marking 71 on the enclosure 7. As a result, the angle of incidence θss of the detection light can be roughly fixed in the projection area PS of screens having sizes ranging from 60 to 120 inches, whereby the situation in which the low contrast area based on the first detection light radiating section 251 and the low contrast area based on the second detection light radiating section 252 overlap with each other can be avoided. Further, in a case where the size of the projection area where a projection image is displayed varies, that is, in both the projection areas PS1 and PS2, the same performance of detection of the pointing element 3 can be achieved.

The projection system 1 according to the present embodiment described above provides the following advantageous effects.

Since the first detection light radiating section 251 is configured to be capable of changing the distance to the second detection light radiating section 252, the distances from the detection light radiating section 251 and 252 to the projection area PS can be changed, whereby the detection light radiating sections 251 and 252 can radiate the detection light in such a way that the low contrast areas based thereon are complementary to each other. Further, even when the size of the screen (size of projection area where projection image is displayed) varies, the relative relationship between the detection light radiation range and the projection area PS (in terms of position and size) can be maintained constant. Therefore, since the projection area PS can be appropriately irradiated with the detection light for detecting the pointing element 3, the imaging section 27 can capture an image that allows detection of the position of the pointing element 3, whereby the position of the pointing element 3 can be appropriately detected. The reliability of the projection system 1 and the projector 2 can therefore be improved.

Second Embodiment

A second embodiment of the invention will next be described with reference to the drawings.

A projection system according to the present embodiment has the same configuration as that of the projection system 1 according to the first embodiment described above. The first detection light radiating section 251 and the second detection light radiating section 252 of the projector 2, which forms the projection system 1 according to the first embodiment, each include the plate-shaped reflection mirror 6. In contrast, a first detection light radiating section and a second detection light radiating section of a projector according to the present embodiment each include a reflection mirror having a free-form surface. In this regard, the first and second detection light radiating sections of the projector according to the present embodiment differ from the first and second detection light radiating sections 251, 252 described above. In the following description, the same or roughly the same portions as those having been already described have the same reference characters and will be described in a simplified manner or will not be described.

Figure 12:
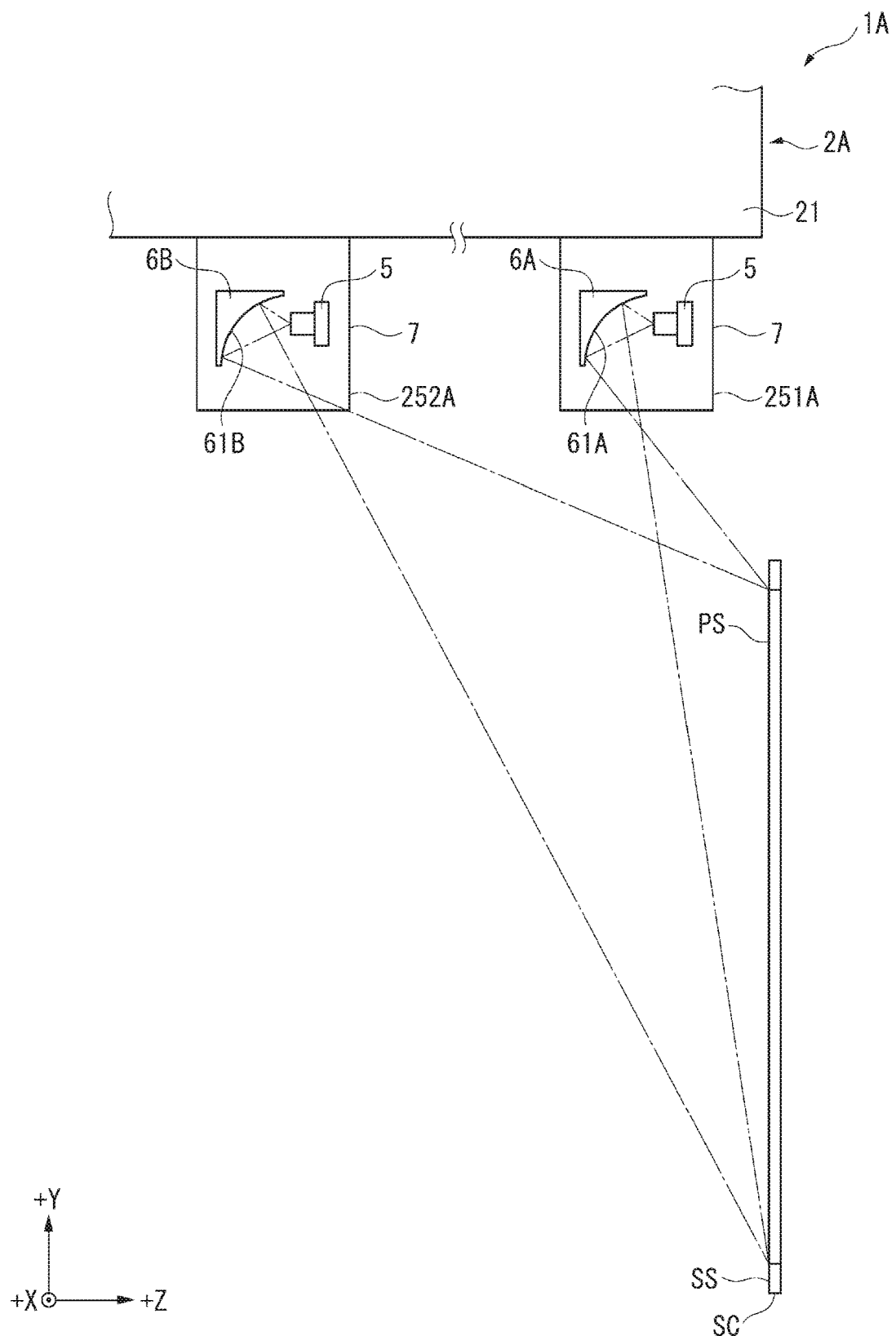
FIG. 12 shows the configuration of detection light radiating sections of a projector in a projection system according to a second embodiment of the invention.

FIG. 12 is a schematic view showing a projection system 1A according to the present embodiment.

A projector 2A according to the present embodiment includes a first detection light radiating section 251A and a second detection light radiating section 252A in place of the first and second detection light radiating sections 251, 252, as shown in FIG. 12. The first and second detection light radiating sections 251A, 252A are attached to the exterior enclosure 21 and in the same positions where the first and second detection light radiating sections 251, 252 described above are attached. The first and second detection light radiating sections 251A, 252A each radiate the detection light onto the projection area PS of the screen surface SS of the screen SC, as the first and second detection light radiating sections 251, 252 described above do.

The first detection light radiating section 251A includes not only the light source 5 and the enclosure 7 described above but a reflection mirror 6A in place of the reflection mirror 6 described above. Similarly, the second detection light radiating section 252A includes not only the light source 5 and the enclosure 7 described above but a reflection mirror 6B in place of the reflection mirror 6 described above.

Among the components described above, the reflection mirrors 6A and 6B are each a free-form mirror having a concave surface (hereinafter referred to as free-form surfaces 61A and 61B) that decreases the light flux density of the detection light to be incident on the +Y-direction side of the projection area PS out of the detection light incident on the reflection mirror but increases the light flux density of the detection light to be incident on the −Y-direction side of the projection area PS out of the detection light incident on the reflection mirror. Therefore, the detection light incident on the free-form surfaces 61A and 61B of the reflection mirrors 6A and 6B is reflected off the free-form surfaces 61A and 61B, and the projection area PS is irradiated with the thus homogenized detection light. That is, the reflection mirrors 6A and 6B each have the function of homogenizing in-plane illuminance of the detection light in the projection area PS. In the projection area PS, the light flux density of the detection light incident on the reflection mirrors 6A and 6B and reflected off the reflection mirrors 6A and 6B toward the projection area PS is thus roughly homogenized.

Since the distance from the first detection light radiating section 251A to the projection area PS is longer than the distance from the second detection light radiating section 252A to the projection area PS in the direction along the direction, the free-form surface 61A of the reflection mirror 6A of the first detection light radiating section 251A and the free-form surface 61B of the reflection mirror 6B of the second detection light radiating section 252A differ from each other in terms of design, and the free-form surfaces 61A and 61B are so designed that when the detection light is radiated from the positions of the first and second detection light radiating sections 251A, 252A, the projection area PS is appropriately irradiated with the detection light.

The projection system 1A according to the present embodiment described above provides not only the same advantageous effects as those provided by the projection system 1 according to the first embodiment described above but the following advantageous effects.

Since the light flux density of the detection light depending on the radiation angular range and the radiation angle can be controlled by the free-form surfaces 61A and 61B of the reflection mirrors 6A and 6B, the detection light can be readily controlled.

Since the reflection mirrors 6A and 6B of the first and second detection light radiating sections 251A, 252A have the free-form surfaces 61A and 61B described above, the light flux density of the detection light outputted from the first and second detection light radiating sections 251A, 252A can be roughly homogenized in the projection area PS. Since decrease in the intensity of the detection light can therefore be suppressed even on the −Y-direction side of the projection area PS, which is far away from the detection light radiating section 251A and 252A and where the intensity of the detection light therefore tends to decrease, the brightness of a captured image of the pointing element 3 is homogenized even when the pointing element is located in any position in the projection area. PS, whereby the pointing element 3 is readily detected as compared with the projector 2 according to the first embodiment described above.

Since the reflection mirrors 6A and 6B reflect the detection light incident on the +Y-direction side (upper side) of the mirrors toward the −Y-direction side (lower side) of the screen and reflect the detection light incident on the −Y-direction side (lower side) of the mirrors toward the +Y-direction side (upper side) of the screen, the detection light reflected off the reflection mirrors 6A and 6B is temporarily focused. As a result, the clearance between the light source 5 and the detection light increases, and the distance between the mirrors 6A, 6B and the light source 5 can be shortened accordingly, whereby the size of each of the first and second detection light radiating sections 251A, 252A can be reduced.

For example, in a case where the detection light is so outputted as to incline downward (toward −Y-direction side) with respect to the direction along a normal to the projection area PS (direction along +Z direction), the size of each of the reflection mirrors 6A and 6B increases, as will be described in a third embodiment. On the other hand, in a case where the detection light is so outputted as to incline toward the +Y-direction side, the clearance between the light source 5 and the detection light decreases, and the detection light is blocked by the light source 5, so that the detection light cannot reach part of the projection area PS.

In contrast, in the present embodiment, the light source 5 of each of the first and second detection light radiating sections 251A, 252A emits the detection light in the direction along normal to the projection area PS (−Z direction), the size of each of the reflection mirrors 6A and 6B can be reduced, and the situation in which the detection light is blocked by the light source 5 and cannot therefore reach part of the projection area PS can be avoided.

Third Embodiment

A third embodiment of the invention will next be described with reference to the drawings.

A projection system according to the present embodiment has the same configuration as that of the projection system 1A according to the second embodiment described above. The first detection light radiating section 251A and the second detection light radiating section 252A of the projector 2A, which forms the projection system 1A according to the second embodiment, include the reflection mirrors 6A and 6B having roughly the same shape in contrast, a first detection light radiating section of a projector according to the present embodiment includes a reflection mirror having a free-form surface lager than that of the reflection mirror 6A according to the second embodiment described above, and the direction in which the detection light exits from the light source 5 toward the reflection mirror differs from the direction in the second embodiment described above. In this regard, the first detection light radiating section of the projector according to the present embodiment differs from the first detection light radiating section 251A described above. In the following description, the same or roughly the same portions as those having been already described have the same reference characters and will be described in a simplified manner or will not be described.

Figure 13:
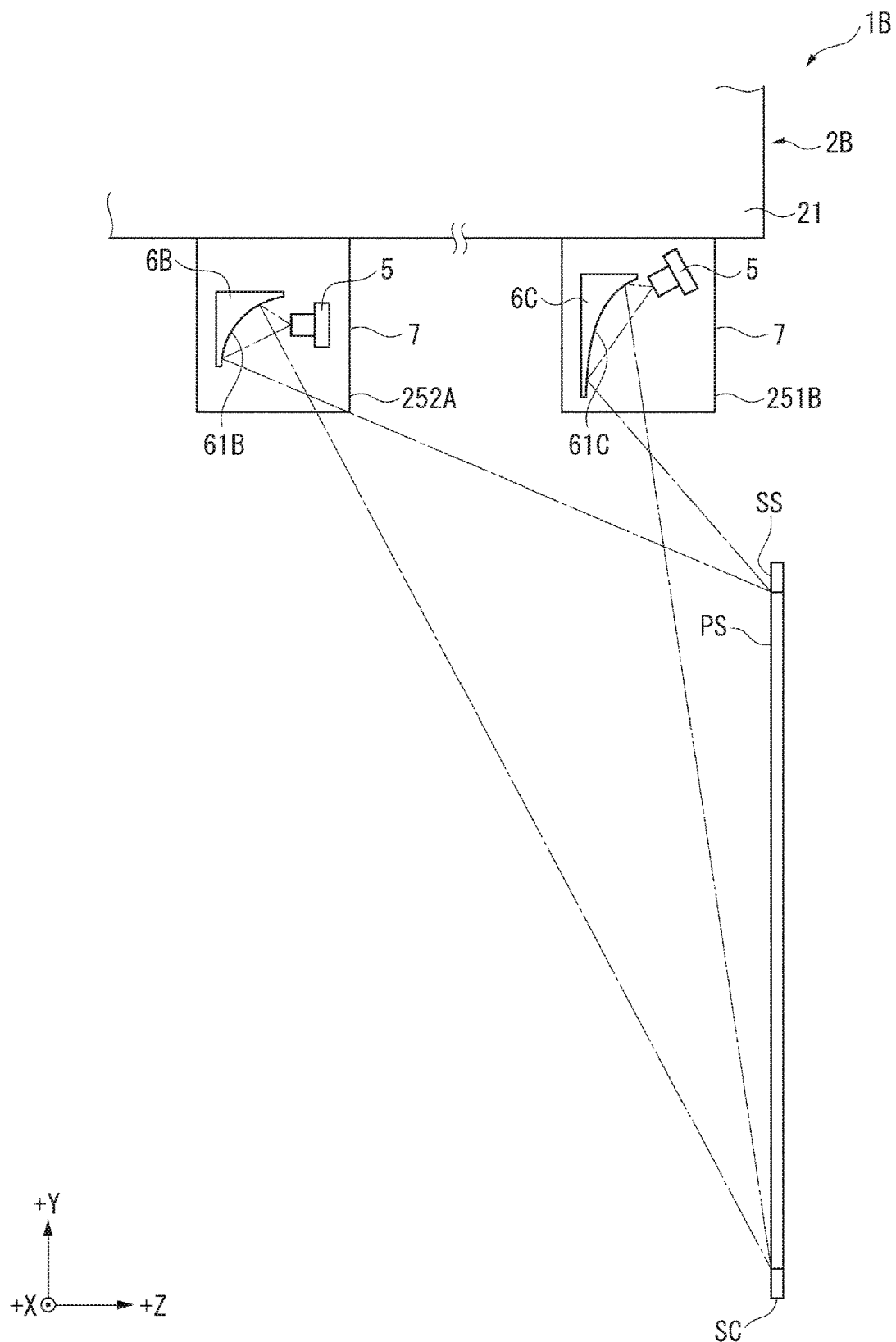
FIG. 13 shows the configuration of a projector in a projection system according to a third embodiment of the invention.

FIG. 13 is a schematic view showing a projection system 18 according to the present embodiment.

A projector 2B according to the present embodiment includes a first detection light radiating section 251B in place of the first detection light radiating section 251A described above, as shown in FIG. 13. The first detection light radiating section 251B is attached to the exterior enclosure 21 and in the same position where the first detection light radiating sections 251 and 251A are each attached. The first detection light radiating section 251B radiates the detection light onto the projection area PS of the screen surface SS of the screen SC, as the first detection light radiating sections 251 and 251A described above do.

The first detection light radiating section 251B includes not only the light source 5 and the enclosure 7 described above but a reflection mirror 6C in place of the reflection mirror 6A described above.

In the present embodiment, the light source 5 emits the detection light in a direction that inclines downward. (toward −Y-direction side) with respect to the direction along a normal to the projection area PS (direction along +Z direction). The light source 5 is therefore disposed in a position shifted from the position of the light source 5 in the first and second embodiments toward the side opposite the projection area PS.

The light source 5 preferably inclines toward the −Y-direction side with respect to the direction along a normal to the projection area PS (direction along +Z direction) by an angle ranging from 0° to 15°. In the present embodiment, the light source 5 inclines by 10° toward the −Y-direction side with respect to the direction along the +Z direction.

The reflection mirror 6C is a free-form mirror having a concave surface (hereinafter referred to as free-form surface 61C) that decreases the light flux density of the detection light to be incident on the +Y-direction side of the projection area PS out of the detection light on the reflection mirror but increases the light flux density of the detection light to be incident on the −Y-direction side of the projection area PS out of the detection light incident on the reflection mirror.

The detection light incident on the free-form surface 61C of the reflection mirror 6C is reflected off the free-form surface 61C, and the projection area PS is irradiated with the thus homogenized detection light. That is, the reflection mirror 6C has the function of roughly homogenizing in-plane illuminance of the detection light in the projection area PS. In the projection area PS, the light flux density of the detection light incident on the reflection mirrors 6C and 6B and reflected off the reflection mirrors 6C and 6B toward the projection area PS is thus roughly homogenized.

The projection system 1B according to the present embodiment described above provides not only the same advantageous effects as those provided by the projection systems 1 and 1A according to the first and second embodiments described above but the following advantageous effects Since the light source 5 emits the detection light in a direction that inclines downward (toward −Y-direction side) with respect to the direction along a normal to the projection area PS (direction along +Z direction), distribution in which the density of the light radiated from the light source decreases from, the upper side (+-Y-direction side) to the lower side (−Y-direction side) of the reflection mirror 6C can be achieved. The reflected light from the upper side of the reflection mirror 6C is a light flux incident on the −Y-direction side of the projection area PS. The free-form surface 6C described above is so designed that the density of the light flux that exits from the upper side of the reflection mirror 6C is greater than the density of the light flux that exits from the lower side of the reflection mirror 6C. Further, in the present embodiment, since the fact that the light source 5 inclines toward the −Y-direction side also creates a light flux density distribution, the uniformity of the light flux density of the detection light in the projection area PS is improved by a greater degree, whereby the pointing element 3 can be more readily detected. Further, since the burden on the shape of the free-form surface 61C for improving the light flux density is lowered, the degree of complexity of the shape of the free-form surface 61C can be suppressed, whereby the reflection mirror 6C can be readily designed and manufactured with increased processing accuracy. The performance of detection of the pointing element 3 can therefore be increased.

Variations of Embodiments

The invention is not limited to the embodiments described above, and changes, improvements, and other modifications of the embodiments described above to the extent that the advantage of the invention is achieved fall within the scope of the invention.

In each of the embodiments described above, the detection light radiating section 251, 251A, or 251B, which has the shortest distance to the projection area PS in the direction of a normal thereto, is so configured that the distance to the second detection light radiating section 252 or 252A in the direction along the +Z direction is changeable, but not necessarily. For example, the second detection light radiating section 252 or 252A may be so configured that the distance to the first detection light radiating section 251, 251A, or 251B in the direction along the +Z direction is changeable. In this case, the first detection light radiating section 251, 251A, or 251B may be movable in the direction described above or may be fixed to the exterior enclosure 21. That is, at least one of the first detection light radiating section 251, 251A, or 251B and the second detection light radiating section 252 or 252A only needs to be so configured that the distance to the other detection light radiating section is changeable, and the movement direction described above is also not limited to the direction along the +Z direction described above. For example, in addition to or in place of the +Z direction, the detection light radiating section may be configured to movable in the +Y direction and +X direction in addition to or in place of the +Z direction.

In each of the embodiments described above, the first detection light radiating section 251, 251A, or 251B and the second detection light radiating section 252 or 252A are provided, but not necessarily. For example, three or more detection light radiating sections may be provided. In this case, in each of the embodiments described above, the first detection light radiating section 251, 251A, or 251B, which has the shortest distance to the projection area PS in the direction of a normal thereto, is configured to be movable in the direction away from the second detection light radiating section 252 or 252A (+Z direction), but not necessarily. For example, a detection light radiating section other than the detection light radiating section having the longest distance to the projection area PS may be configured to movable in the +Z direction.

In each of the embodiments described above, the exterior enclosure 21 includes the slidable member 211, which is slidable in the direction along the +Z direction, and the first detection light radiating section 251 is attached to the slidable member 211, but not necessarily, and the exterior enclosure 21 may not include the slidable member 211. In this case, for example, the fixture 4, which fixes the projector 2, may include a support that supports the first detection light radiating section 251, 251A, or 251B.

According to the configuration described above, since the support of the fixture 4, which fixes the projector 2, can support the first detection light radiating section 251, 251A, or 251B, the first detection light radiating section 251, 251A, or 251B is allowed to approach the second detection light radiating section 252 or 252A or move away therefrom. Therefore, the situation in which the low contrast area based on the first detection light radiating section 251, 251A, or 251B in the projection area PS overlaps with the low contrast area based on the second detection light radiating section 252 or 252A in the projection area PS can be avoided, whereby the position of the pointing element 3 can be reliably detected.

In a case where markings similar to the markings 2111 are provided in the vicinity of the support described above, achieving the state in which any of the markings coincides with the marking 71 on the first detection light radiating section 251, 251A, or 251B allows the first detection light radiating section 251, 251A, or 251B to be moved to a position where the first detection light radiating section can appropriately radiate the detection light onto any of screens having different sizes (screen having size ranging from 60 to 120 inches, for example) that is, any of projection areas which is part of any of different-size screens and in which a projection image is displayed, whereby the projection area PS described above can be more appropriately irradiated with the detection light.

Further, in the configuration described above, the fixture 4 may further include not only the support that supports the first detection light radiating section 251, 251A, or 251B but a support that supports another detection light radiating section (second detection light radiating section 252 or 252A)

In the first and second embodiments described above, the light source 5 in each of the first and second detection light radiating sections 251, 251A, 252, and 252A emits the detection light in the direction along a normal to the projection area PS (−Z direction), but not necessarily. For example, the light source 5 described above may emit the detection light in a direction that inclines with respect to the direction along the normal.

In the second and third embodiments described above, the reflection mirrors 6A to 6C have the free-form surfaces 61A to 61C, but not necessarily. For example, the reflection mirrors 6A to 6C may each have a convex surface or a concave surface different from the free-form surfaces 61A to 61C described above.

In each of the embodiments described above, the light source 5 emits the detection light toward the reflection mirror 6, 6A, 6B, or 6C, but not necessarily. For example, the light source 5 may emit the detection light directly toward the projection area PS. In this case, a lens or any other component that diffuses the detection light may be provided in place of the reflection mirror 6 or 6A to 6C. Even the configuration described above allows the projection area PS to be irradiated with the detection light.

In each of the embodiments described above, the projection system 1, 1A, and 1B are formed of the projector 2, 2A, and 2B and the screen SC having the projection area PS, where a projection image is projected, but not necessarily. For example, each of the projection systems may include a whiteboard or any other object in place of the screen SC.

In each of the embodiments described above, the light source 5 includes four LEDs (not shown), but not necessarily, and the number of LEDs can be changed as appropriate.

Further, the number of in-operation LEDs in the detection light radiating section 251, which is close to the projection area PS, is smaller than the number of in-operation LEDs in the detection light radiating section 252, but the number in the detection light radiating section 251 may be equal to or greater than the number in the detection light radiating section 252. Further, the four LEDs described above are arranged in a roughly rhombic shape when viewed in the direction along the +Z direction, but not necessarily. The four LEDs may be arranged in a roughly square shape or in series.

In each of the embodiments described above, the first detection light radiating section 251, 251A, or 251B and the second detection light radiating section 252 or 252A as the detection light radiators are provided in the projector 2, 2A, or 2B, but not necessarily. For example, the detection light radiating sections may be used in any other electronic instrument that requires detection of a target object, such as a pointing element.

In each of the embodiments described above, the first detection light radiating section 251, 251A, or 251B and the second detection light radiating section 252 or 252A are disposed on the outer side of the exterior enclosure 21, but not necessarily. For example, the second detection light radiating section 252 or 252A may be disposed in the exterior enclosure 21. In this case, the exterior enclosure 21 may be provided with an opening through which the detection light outputted from the detection light radiating section passes. Further, is the case where the first detection light radiating section 251, 251A, or 251B approaches the second detection light radiating section 252 or 252A, they may be disposed in the exterior enclosure 21.

The entire disclosure of Japanese Patent Application No. 2016-210306, filed Oct. 27, 2016 is expressly incorporated by reference herein.

What is claimed is:

1. A projector comprising:
an exterior enclosure that forms an exterior of the projector;
a light source apparatus;
a light modulator that modulates light outputted from the light source apparatus to form a projection image;
a projection optical apparatus that projects the projection image formed by the light modulator onto a projection area;
a plurality of detection light radiators that are aligned in a direction normal to the projection area and that radiate detection light used to detect a pointing element onto the projection area;
an imager that receives light that belongs to a wavelength region including a wavelength of the detection light to capture an image of the projection area; and
a position detector that detects a position of the pointing element in the projection area based on the image captured by the imager,
wherein the plurality of detection light radiators are arranged in different positions on the exterior enclosure,
the plurality of detection light radiators include at least a first detection light radiator that radiates a first detection light onto the projection area and a second detection light radiator that radiates a second detection light onto the projection area,
a distance from the second detection light radiator to the projection optical apparatus is shorter than a distance from the first detection light radiator to the projection optical apparatus,
the second detection light radiator is fixed in position relative to the exterior enclosure, and
the first detection light radiator is so configured that a position of the first detection light radiator is changeable relative to a position of the second detection light radiator so that, on the projection area, an area which is radiated by the first detection light overlaps an area which is radiated by the second detection light.

2. The projector according to claim 1,
wherein the first detection light radiator has a shortest distance to the projection area in the direction of the normal to the projection area.

3. The projector according to claim 1,
wherein the plurality of detection light radiators each include
a light source that emits the detection light toward a side opposite the projection area, and
a reflection mirror that reflects the detection light emitted from the light source toward the projection area, and
the reflection mirror has a concave surface that is concave in a direction along a direction in which the light is incident.

4. The projector according to claim 3,
wherein the light source provided in at least one of the plurality of detection light radiators emits the detection light in the direction along the normal to the projection area.

5. The projector according to claim 3,
wherein the light source of the first detection light radiator emits the detection light in a direction that inclines with respect to the normal to the projection area.

6. A projection system comprising:
the projector according to claim 1; and
a fixture that fixes the projector in a predetermined position,
wherein,
the fixture includes a support that supports at least one of the plurality of detection light radiators.

7. A projection system comprising:
the projector according to claim 2; and
a fixture that fixes the projector in a predetermined position,
wherein the fixture includes a support that supports at least one of the plurality of detection light radiators.

8. A projection system comprising:
the projector according to claim 3; and
a fixture that fixes the projector in a predetermined position,
wherein the fixture includes a support that supports at least one of the plurality of detection light radiators.

9. A projection system comprising:
the projector according to claim 4; and
a fixture that fixes the projector in a predetermined position,
wherein the fixture includes a support that supports at least one of the plurality of detection light radiators.

10. A projection system comprising:
the projector according to claim 5; and
a fixture that fixes the projector in a predetermined position,
wherein the fixture includes a support that supports at least one of the plurality of detection light radiators.

11. The projector according to claim 1,
wherein a distance from the first detection light radiator to the projection area is shorter than a distance from the second detection light radiator to the projection area.

* * * * *